(12) United States Patent
Hill

(10) Patent No.: US 6,753,968 B2
(45) Date of Patent: *Jun. 22, 2004

(54) OPTICAL STORAGE SYSTEM BASED ON SCANNING INTERFEROMETRIC NEAR-FIELD CONFOCAL MICROSCOPY

(75) Inventor: Henry Allen Hill, Tucson, AZ (US)

(73) Assignee: Zetetic Institute, Tucson, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 10/354,807

(22) Filed: Jan. 30, 2003

(65) Prior Publication Data

US 2003/0147083 A1 Aug. 7, 2003

Related U.S. Application Data

(63) Continuation of application No. 09/631,234, filed on Aug. 2, 2000, now Pat. No. 6,606,159.
(60) Provisional application No. 60/221,200, filed on Jul. 27, 2000, and provisional application No. 60/147,196, filed on Aug. 2, 1999.

(51) Int. Cl.⁷ .............................. G01B 9/02; G02B 21/00
(52) U.S. Cl. ........................ 356/491; 356/487; 359/371
(58) Field of Search ................................ 356/450, 491, 356/511, 512, 495, 521; 359/370, 371

(56) References Cited

U.S. PATENT DOCUMENTS

| | | | |
|---|---|---|---|
| 4,659,429 A | * | 4/1987 | Isaacson et al. ............... 216/24 |
| 4,681,451 A | | 7/1987 | Guerra et al. |
| 5,004,307 A | | 4/1991 | Kino et al. |
| 5,105,403 A | | 4/1992 | Kando et al. |
| 5,105,408 A | | 4/1992 | Lee et al. |
| 5,121,256 A | | 6/1992 | Corle et al. |
| 5,125,750 A | | 6/1992 | Corle et al. |
| 5,150,338 A | | 9/1992 | Birecki et al. |
| 5,214,630 A | | 5/1993 | Goto et al. |
| 5,349,443 A | | 9/1994 | Guerra |
| 5,371,588 A | | 12/1994 | Davis et al. |
| 5,442,443 A | | 8/1995 | Guerra |

(List continued on next page.)

FOREIGN PATENT DOCUMENTS

| | | |
|---|---|---|
| EP | 0 409 468 A2 | 1/1991 |
| EP | 0 757 271 A2 | 2/1997 |
| JP | 5-73980 | 5/1993 |
| JP | 5-174410 | 5/1993 |

OTHER PUBLICATIONS

U.S. application 09/917,399 to Henry A. Hill.*
Bauer et al., "Magnetic Domain Imaging with a Scanning Near–Field Optical Microscope Using a Modified Sagnac Interferometer," *Journal of Microscopy*, 194:2/3:507–511, May/Jun. 1999.

(List continued on next page.)

*Primary Examiner*—Frank G. Font
*Assistant Examiner*—Patrick J Connolly
(74) *Attorney, Agent, or Firm*—Fish & Richardson P.C.

(57) ABSTRACT

A near-field, interferometric optical microscopy system includes: a beam splitter positioned to separate an input beam into a measurement beam and a reference beam; a mask positioned to receive the measurement beam, the mask comprising at least one aperture having a dimension smaller than the wavelength of the input beam, wherein the mask aperture is configured to couple at least a portion of the measurement beam to a sample to define a near-field probe beam, the sample interacting with the near-field probe beam to define a near-field signal beam; a detector having an element responsive to optical energy; and optics positioned to direct at least a portion of the reference beam and at least a portion of the near-field signal beam to interfere at the detector element.

46 Claims, 16 Drawing Sheets

U.S. PATENT DOCUMENTS

| | | | |
|---|---|---|---|
| 5,497,359 A | | 3/1996 | Mamin et al. |
| 5,602,643 A | * | 2/1997 | Barrett ........................ 356/495 |
| 5,602,819 A | | 2/1997 | Inagaki et al. |
| 5,602,820 A | | 2/1997 | Wickramasinghe et al. |
| 5,666,197 A | | 9/1997 | Guerra |
| 5,689,480 A | | 11/1997 | Kino |
| 5,737,084 A | * | 4/1998 | Ishihara ....................... 356/609 |
| 5,739,527 A | | 4/1998 | Hecht et al. |
| 5,760,901 A | | 6/1998 | Hill |
| 5,789,734 A | | 8/1998 | Torigoe et al. |
| 5,834,767 A | | 11/1998 | Hasegawa et al. |
| 5,883,872 A | | 3/1999 | Kino |
| 6,154,326 A | | 11/2000 | Ueyanagi et al. |
| 6,249,352 B1 | * | 6/2001 | Davies et al. ................ 356/512 |
| 6,552,805 B2 | * | 4/2003 | Hill ............................. 356/511 |
| 2002/0021451 A1 | * | 2/2002 | Hill ............................. 356/511 |

OTHER PUBLICATIONS

Courjon et al., "New Optical Near–Field Developments: Some Perspectives in Interferometry," *Ultramicroscopy*, 61:117–125, 1995.

Pilevar et al., "Reflection Near–field Scanning Optical Microscopy: an Interferometric Approach," *Ultramicroscopy*, 61:233–236, 1995.

Pohl et al., "Near–field Optics: Light for the World of NANO," *J. Vacc. Sci. Technol. B*, 12:3:1441–1446, May/Jun. 1994.

Vaez–Iravani et al., "Phase Contrast and Amplitude Pseudoheterodyne Interference Near Field Scanning Optical Microscopy," *Appl. Phys. Lett.* 62:10:1044–1046, Mar. 8, 1993.

Fischer, "Optical Characteristics of 0.1 îm Circular Apertures in a Metal Film as Light Sources for Scanning Ultramicroscopy," *J. Vac. Sci Technol. B* 3:1:386–390, Jan./Feb. 1985.

Fischer et al., "Near–Field Optical ScanningMicroscopy and Enhanced Spectroscopy with Submicron Apertures," *Scanning Microscopy Supplement*, 1:47–52, 1987.

Durig et al., "Near–Field Optical–Scanning Microscopy," *J. Appl. Phys.* 59:10:3318–3327, May 15, 1986.

Meixner et. al., "Direct Measurement of Standing Evanescent Waves with a Photon–Scanning Tunneling Microscope," *Applied Optics*, 33:34:7995–8000, Dec. 1, 1994.

Bainier et al., "Evanescent Interferometry by Scanning Optical Tunneling Detection," *J.Opt.Soc.Am.A*, 13:2:267–275, Feb. 1996.

Guerra, "Photon Tunneling Microscopy," *Applied Optics*, 29:26:3741–3752, Sep. 10, 1990.

\* cited by examiner

OPTICAL STORAGE SYSTEM BASED ON SCANNING INTERFEROMETRIC NEAR-FIELD CONFOCAL MICROSCOPY

CROSS-REFERENCE TO RELATED APPLICATIONS

This application claims priority from U.S. patent application Ser. No. 09/631,234 filed Aug. 2, 2000 and issued as U.S. Pat. No. 6,606,159 on Dec. 23, 2003, which in turn claims priority to provisional application Serial No. 60/147,196 filed Aug. 2, 1999 by Henry A. Hill entitled "Scanning Interferometric Near-Field Confocal Microscopy" and Serial No. 60/221,200, filed Jul. 27, 2000 by Henry A. Hill entitled "Scanning Interferometric Near-Field Confocal Microscopy," the contents of each application being incorporated herein by reference.

BACKGROUND

Scanning microscopy techniques, including near-field and confocal scanning microscopy, conventionally employ a single spatially localized detection or excitation element, sometimes known as the scanning probe [see, e.g., "Near-field Optics: Theory, Instrumentation, and Applications," M. A. Paesler and P. J. Moyer, (Wiley-New York) (1996); "Confocal Laser Scanning Microscopy," C. Sheppard, BIOS (Scientific-Oxford and Springer-New York) (1997).] The near-field scanning probe is typically a sub-wavelength aperture positioned in close proximity to a sample; in this way, sub-wavelength spatial resolution in the object-plane is obtained. The sub-wavelength aperture is an aperture smaller than the free-space optical wavelength of the optical beam used in the near-field microscopy application. Spatially extended images, e.g., two dimensional images, are acquired by driving the scanning probe in a raster pattern.

SUMMARY OF THE INVENTION

The invention features systems and methods that incorporate interferometric techniques into near-field microscopy. The near-field aspects of the system provide high spatial resolution and the interferometric techniques enhance the signal-to-noise ratio. Moreover, the systems and methods can further incorporate confocal microscopy techniques to further enhance the signal-to-noise ratio. The systems and methods can operate in reflection or transmission mode, and can be used to study surface properties of an unknown sample, to inspect a sample, such as microlithography mask or reticle, and to read information from, and/or write information to, and optical storage medium.

The systems and methods produce a near-field probe beam by illuminating a mask having an aperture with a dimension smaller than the free-space wavelength of the illuminating beam. The near-field probe beam interacts with a sample to produce a near-field signal beam, which is subsequently mixed with a reference beam to produce an interference signal. The properties of the near-field probe beam, such as its electric field and magnetic field multipole expansions, and their resulting interaction with the sample can be controlled by varying the incident angle of the illuminating beam, varying the distance between the mask and the sample, and tailoring the properties of the aperture. Furthermore, in some embodiments, the polarization and wavelength of the near-field probe beam can be varied.

The interference signal produced by interfering the near-field signal beam with a reference beam increases the near-field signal because the resulting signal scales with the amplitude of the near-field signal beam rather than its intensity. Furthermore, the changes in the phase and/or amplitude of the near-field signal beam, and the surface information corresponding to such changes, can be derived from the interference signal as the near-field probe beam scans the sample. Moreover, background contributions to the interference signal can be suppressed by introducing multiple phase shifts between the reference beam and the near-field probe beam and analyzing the interference signals as a function of the phase shifts. The phase shifts can be introduced, e.g., by using a phase-shifter or by introducing a difference frequency in components of input beam used to produce the near-field probe beam and the reference beam. In many embodiments, the phase shifting techniques are used in conjunction with a mask further having a non-transmissive scattering site adjacent the aperture, with the systems and methods producing an interference signal derived from mixing the light scattered from the scattering site with the reference beam to provide information about background signals that may be present in the interference signal derived from the near-field signal beam.

In further embodiments, the mask includes an array of apertures to direct an array of near-field probe beams to different locations on the sample, and the methods and systems produce a corresponding array of interference signals to more rapidly analyze the sample.

One embodiment of the invention can be generally described as follows.

An input beam including a linearly polarized single frequency laser beam is incident on a beam splitter. A first portion of the input beam is transmitted by the beam splitter as a measurement beam. A first portion of the measurement beam is incident on a sub-wavelength aperture in a conducting surface and a first portion thereof is transmitted as a near-field probe beam. The wavelength referenced in the sub-wavelength classification of the size of the sub-wavelength aperture is the wavelength of the input beam. A portion of the near-field probe beam is reflected and/or scattered by an object material back to the sub-wavelength aperture and a portion thereof is transmitted by the sub-wavelength aperture as a near-field return probe beam (i.e., the near-field signal beam). A second portion of the measurement beam incident on the sub-wavelength aperture is scattered by the sub-wavelength aperture as a first background return beam. The near-field return probe beam and the first background return beam comprise a return beam.

A second portion of the measurement beam is incident on a sub-wavelength non-transmitting scattering site located on the conductor at a position laterally displaced from the sub-wavelength aperture in the conductor by a preselected distance. The preselected distance is greater than or of the order of the wavelength of the input beam. A portion of the measurement beam incident on the sub-wavelength scattering site is scattered as a second background return beam.

A second portion of the input beam is reflected by the beam splitter as a reference beam. The reference beam is incident on a reference object and reflected as a reflected reference beam.

The return beam and a portion of the reflected reference beam are incident on the beam splitter and mixed by a polarizer as a first mixed beam. The first mixed beam is then focused on a pinhole in an image plane such that an image of a sub-wavelength aperture is in focus in the plane of the pinhole. The size of the preselected separation of the sub-wavelength aperture and the sub-wavelength scattering site, the size of the pinhole, and the resolution of an imaging system producing the image of the sub-wavelength aperture on the pinhole are selected such that a substantially reduced portion of the second background return beam is transmitted by the pinhole. A portion of the focused first mixed beam is transmitted by the pinhole and detected, preferably by a quantum photon detector [see Section 15.3 in Chapter 15 entitled "Quantum Detectors", *Handbook of Optics*, 1, 1995 (McGraw-Hill, New York) by P. R. Norton], to generate a first electrical interference signal. The amplitude and phase of the first electrical interference signal is measured.

The second background return beam and a second portion of the reflected reference beam are incident on the beam splitter, mixed by a polarizer, and the second mixed beam is then focused on a second pinhole such that the sub-wavelength scattering site is in focus in the plane of the second pinhole. The size of the preselected separation of the sub-wavelength aperture and the sub-wavelength scattering site, the size of the second pinhole, and the resolution of an imaging system producing the image of the sub-wavelength scattering site on the second pinhole are selected such that a substantially reduced portion the return beam is transmitted by the second pinhole. A portion of the focused second mixed beam is transmitted by the second pinhole and detected, preferably by a quantum photon detector, to generate a second electrical interference signal.

The amplitude and phase of the second interference signal are measured and the measured amplitude and phase of the second interference signal is used to compensate for the effects of the first background return beam on the measured amplitude and phase of the first electrical interference signal.

The measured amplitude and phase of the compensated first electrical interference signal are analyzed for the determination of the amplitude and phase of the near-field return probe beam. Next, the object is scanned and a resulting array of determined amplitudes and phases of near-field return probe beam are obtained and subsequently analyzed for information about the distance between the sub-wavelength aperture in the conductor and the object material and for information about the structure of the object material.

The scanning of the object can be in either a step and repeat mode or a continuous mode. For a continuous scanning mode, the source is preferably pulsed.

In further embodiments, the sub-wavelength aperture, the sub-wavelength scattering site, the first pinhole, the second pinhole, and the detector are replaced by arrays of sub-wavelength apertures, sub-wavelength scattering sites, first pinholes, second pinholes, and detector pixels. In certain other embodiments, the measurement beam is incident on the sub-wavelength aperture(s) and sub-wavelength scattering site(s) at a large angle of incidence.

In further embodiment, the sample object is an optical recording medium. For example, the object material can comprise a magneto-optical material, and the near-field return probe beam is measured to determine the state of magnetization of magneto-optical domains comprising the magneto-optical material used as the optical recording medium. Data are stored on the magneto-optical material by locally heating the magneto-optical material with near-field probe beams in the presence a magnetic field.

Aspects and features disclosed in the following, commonly-owned provisional applications may also be incorporated into the embodiments described in the present application: Serial No. 60/221,086 filed Jul. 27, 2000 by Henry A. Hill entitled "Scanning interferometric near-field confocal microscopy with background amplitude reduction and compensation;" Serial No. 60/221,019 filed Jul. 27, 2000 by Henry A. Hill and Kyle B. Ferrio entitled "Multiple-Source Arrays For Confocal And Near-Field Microscopy;" Serial No. 60/221,091 filed Jul. 27, 2000 by Henry A. Hill entitled "Multiple-Source Arrays with Optical Transmission Enhanced by Resonant Cavities;" U.S. Serial No. 60/221,287 by Henry A. Hill filed Jul. 27, 2000 entitled "Control of Position and Orientation of Sub-Wavelength Aperture Array in Near-field Scanning K Microscopy;" and U.S. Serial No. 60/221,295 by Henry A. Hill filed Jul. 27, 2000 entitled "Differential Interferometric Scanning Near-Field Confocal Microscopy;" the contents of each of the preceding provisional applications being incorporated herein by reference.

In general, in one aspect, the invention features a near-field, interferometric optical microscopy system. The system includes: a beam splitter positioned to separate an input beam into a measurement beam and a reference beam; a mask positioned to receive the measurement beam, the mask including at least one aperture having a dimension smaller than the wavelength of the input beam, wherein the mask aperture is configured to couple at least a portion of the measurement beam to a sample to define a near-field probe beam, the sample interacting with the near-field probe beam to define a near-field signal beam; a detector having an element responsive to optical energy; and optics positioned to direct at least a portion of the reference beam and at least a portion of the near-field signal beam to interfere at the detector element.

Embodiments of the microscopy system may include any of the following features.

The optics and the beam splitter can be positioned to direct the at least a portion of the reference beam and the at least a portion of the near-field signal beam to interfere at the detector element.

The sample can transmit a portion of the near-field probe beam to define the near-field signal beam. The system can further include a second mask positioned to receive the near-field signal beam, the second mask including at least one aperture having a dimension smaller than the wavelength of the input beam, wherein the aperture in the second mask is configured to couple the near-field signal beam to the optics. The optics can include a spatial filter positioned before the detector, the spatial filter including a pinhole aligned with the detector element, and imaging optics positioned to image at least a portion of the near-field signal beam onto the pinhole. For example, the portion of the near-field signal beam imaged onto the pinhole can be that emerging from the aperture in the second mask.

Alternatively, the sample can scatter at least a portion of the near-field probe beam to define the near-field signal beam, and the mask aperture can be configured to couple the near-field signal beam to the optics. Furthermore, the mask aperture can scatter another portion of the measurement beam to define a background return beam, and-the optics can direct the at least a portion of the reference beam, the at least a portion of the near-field signal beam, and at least a portion of the background return beam to interfere at the detector element. In such a case, the mask can further include a scattering site adjacent the aperture, the scattering site having a dimension smaller than the wavelength of the input beam. During operation the scattering site scatters an additional portion of the measurement beam to define a second background return beam, the detector includes a second element responsive to optical energy, and the optics are positioned to direct another portion of the reference beam and at least a portion of the second background return beam to interfere at the second detector element.

Furthermore, the optics can include a spatial filter positioned before the detector, the spatial filter including a pinhole aligned with the detector element, and imaging optics positioned to image at least a portion of the near-field signal beam emerging from the aperture onto the pinhole. Where the mask includes a scattering site, the optics can include a spatial filter positioned before the detector, the spatial filter including a first pinhole aligned with the first detector element and a second pinhole aligned with the second detector element, and imaging optics positioned to image at least a portion of the near-field signal beam emerging from the aperture onto the first pinhole and at least a portion of the second background return beam emerging from the scattering site onto the second pinhole. The optics can further include a reference object positioned to redirect the reference beam towards the detector, the reference object having first and second reflective sites each having a dimension smaller than the wavelength of the input beam. The imaging optics then further image a first portion of the reference beam reflected by the first reflective site onto the first pinhole and a second portion of the reference beam reflected by the second reflective site onto the second pinhole.

The mask can include a plurality of apertures each having a dimension smaller than the wavelength of the input beam, wherein each aperture is configured to couple a portion of the measurement beam to the sample to define a near-field probe beam for the aperture, the sample interacting with the near-field probe beams to define corresponding near-field signal beams. In such a case, the detector includes a plurality of elements each responsive to optical energy, each neat-field signal beam having a corresponding detector element, and the optics direct at least a portion of each near-field signal beam and a portion of the reference beam to interfere at the corresponding detector element.

The mask can include a plurality of apertures each having a dimension smaller than the wavelength of the input beam, wherein each aperture is configured to couple a portion of the measurement beam to the sample to define a probe beam for the aperture, scatter a another portion of the measurement beam to define a background return beam for the aperture, and couples at least a portion of the probe beam scattered by the sample back through itself to define a near-field-signal beam for the aperture. In such a case, the mask can further include a plurality of scattering sites each having a dimension smaller than the wavelength of the input beam, each scattering site being adjacent to one of the apertures, wherein each scattering site is configured to scatter a portion of the measurement beam to define a second background return beam. The detector then includes a plurality of elements each responsive to optical energy, each near-field signal beam having a corresponding detector element and each background return beam having another corresponding detector element, and the optics direct at least a portion of each near-field signal beam and a portion of the reference beam to interfere at the corresponding detector element and at least a portion of each background return beam and another portion of the reference beam to interfere at the other corresponding detector element.

The optics in the microscopy system can define a confocal imaging system.

The system can further include a stage for supporting the sample and at least one of a scanner and a stepper coupled to the stage for adjusting the position of the sample relative to the near-field probe beam. The system can further include a electronic processor coupled to the detector and the at least one of the scanner and the stepper, wherein during operation the electronic processor analyzes at least one signal generated by the detector element as a function of the relative stage position. The system can further include a pulsed source, which during operation generates the input beam, wherein the electronic processor is coupled to the pulse source to synchronize the stage adjustments.

The beam splitter and the mask can be positioned to cause the measurement beam to contact the mask at substantially normal incidence. Alternatively, the beam splitter and the mask can be positioned to cause the measurement beam to contact the mask at an angle of incidence greater than 10°.

The aperture can be defined by a hole in the mask. Alternatively, the mask can include a first material having a first complex refractive index and a second material having a second complex refractive index different from the first complex refractive index, the second material defining the aperture. Also, the mask can include a waveguide defining the aperture. Also, the mask can include a first reflective material and a second dielectric material defining the aperture. Also, where the mask includes a scattering site, the mask can include a reflective first material and a second material having optical properties different from those of the first material, the second material defining the scattering site.

The system can further include a phase shifter positioned to shift the phase of the reference beam relative to the phase of the measurement beam. For example, the phase shifter can be positioned along the path of the reference beam. The system can further include a electronic processor coupled to the detector and the phase shifter, wherein during operation the electronic processor sets the phase shift imparted by the phase shifter to each of multiple values and analyzes a signal generated by the detector element for each of the multiple values.

Where the mask includes at least one aperture and at least one scatter site, the system can further include a phase shifter positioned to shift the phase of the reference beam relative to the phase of the measurement beam and a electronic processor coupled to the detector and the phase shifter, wherein during operation the electronic processor sets the phase shift imparted by the phase shifter to each of one of multiple values and analyzes a signal generated by each of the first and second detector elements for each of the multiple values. For example, the multiple phase shift values can include at least four phase shift values, such as values corresponding to about $\chi_0$, $\chi_0+\pi$, $\chi_0+\pi/2$, and $\chi_0+3\pi/2$ radians, where $\chi_0$ is any constant value. In such a case, for each of the first and second detector elements, the analyzer determines a first difference between the signals corresponding to the phase shift values $\chi_0$ and $\chi_0+\pi$ and a second difference between the signals corresponding to the phase shift values $\chi_0+\pi/2$ and $\chi_0+3\pi/2$ The electronic processor can determine a complex amplitude for the near-field signal beam based on the first and second difference signals for each of the detector elements. Furthermore, the analyzer can use the complex amplitude of the near-field signal beam to derive a physical property of the sample at the location illuminated by the probe beam.

In further embodiments including a phase shifter, the system can further include a electronic processor coupled to the detector and the phase shifter, wherein during operation the electronic processor causes the phase shift $\chi$ imparted by the phase shifter to be modulated according to $\chi=\chi_0+\chi_1 \cos \omega t$, where $\chi_1 \neq 0$, t is time, and $\omega$ is the modulation frequency, and analyzes a signal generated by the detector element with respect to the modulation frequency.

The system can further include a second detector having an element responsive to optical energy, wherein at least one of the optics and the beam splitter is positioned to direct another portion of the reference beam and another portion of the near-field signal beam to interfere at the detector element of the second detector. In such a case, the first and second detectors can define first and second detection channels for the system. The system can further include a first phase shifter positioned to shift the phase of the reference beam relative to the phase of the measurement beam; a second phase shifter positioned to shift the phase of the other portion of the reference beam relative to the other portion of the near-field signal beam; and an electronic processor coupled to the phase shifters.

The system can further include a source for generating the input beam. Furthermore, the source can include a modulator producing a frequency difference $\omega$ between two components of the input beam, the frequency difference $\omega$ producing a phase difference $\omega t$ between the two components of the input beam, where t is time. The system can further include an electronic processor coupled to the detector and the modulator, wherein the electronic processor analyzes a signal produced by the detector with respect to the phase difference $\omega t$. Moreover, the source can be a pulse source, wherein the electronic processor is coupled to the pulsed source to synchronize the signal analysis with the phase difference $\omega t$. Furthermore, the source can cause the input beam to have one of multiple wavelengths. In such a case, the system can further include an electronic processor coupled to the detector and the source, wherein the electronic processor analyzes a signal produced by the detector for each of the multiple wavelengths of the input beam.

The system can further include a retardation plate positioned along the path of the input beam and configured to adjustably control the polarization of the input beam. In such a case, the system can further include an electronic processor coupled to the detector and the retardation plate, wherein during operation the electronic processor causes the retardation plate to impart each of multiple polarizations to the input beam and analyzes a signal generated by the detector element for each of the multiple polarizations.

In another aspect, the invention features a lithography system for use in fabricating integrated circuits on a wafer having alignment marks. The system includes: a stage for supporting the wafer; an illumination system for imaging spatially patterned radiation onto the wafer; a positioning system for adjusting the position of the stage relative to the imaged radiation and the alignment marks; and the near-field, interferometric optical microscopy system described above coupled to the positioning system for identifying the position of the alignment marks on the wafer.

In another aspect, the invention features a beam writing system for use in fabricating a lithography mask. The system includes: a source providing a write beam to pattern a substrate; a stage supporting the substrate; a beam directing assembly for delivering the write beam to the substrate; a positioning system for positioning the stage and beam directing assembly relative one another; and the near-field, interferometric optical microscopy system described above for measuring the surface profile of the patterned substrate.

In another aspect, the invention features, a mask inspection system including: the near-field, interferometric optical microscopy system described above for measuring surface properties of a fabricated mask; and an electronic processing system coupled to the microscopy system, which during operation compares the surface properties of the fabricated mask to stored data. In one embodiment, the stored data is derived from data used to produce the fabricated mask. In another embodiment, the stored data is derived from measurement by the microscopy system of another fabricated mask.

In general, in another aspect, the invention features a microscopy method for measuring surface properties of a sample including: separating an input beam into a measurement beam and a reference beam; directing the measurement beam to a mask including at least one aperture having a dimension smaller than the wavelength of the input beam, wherein the mask aperture couples at least a portion of the measurement beam to the sample to define a near-field probe beam, the sample interacting with the near-field probe beam to define a near-field signal beam; and measuring optical interference between at least a portion of the reference beam and at least a portion of the near-field signal beam. The microscopy method can further include features corresponding to any of the features of the near-field, interferometric optical microscopy system described above.

In another aspect, the invention features an inspection method including using the microscopy method described above to measure surface properties of the sample; and comparing the surface properties to reference data. For example, the sample can be one of a mask, a reticle, and patterned wafer.

In general, in another aspect, the invention features an optical storage system including: a beam splitter positioned to separate an input beam into a measurement beam and a reference beam; a mask positioned to receive the measurement beam, the mask including at least one aperture having a dimension smaller than the wavelength of the input beam, wherein the mask aperture is configured to couple at least a portion of the measurement beam to an optical storage medium to define a near-field probe beam, the storage medium interacting with the near-field probe beam to define a near-field signal beam; a detector having an element responsive to optical energy; and optics positioned to direct at least a portion of the reference beam and at least a portion of the near-field signal beam to interfere at the detector element.

Embodiments of the optical storage system may include any of the following features.

The system can further include an electronic processor coupled to the detector, wherein during operation the electronic processor analyzes signals produced by the detector to determine a memory state of the optical storage medium at the location illuminated by the near-field probe beam.

The system can further include a second detector having an element responsive to optical energy, wherein the optics are positioned to direct a second portion of the reference beam and a second portion of the near-field signal beam to interfere at the element of the second detector. In such a case, the optics can cause the first-mentioned portion of the reference beam and the second portion of the reference beam to have different polarizations and the first-mentioned portion of the near-field signal beam and the second portion of the near-field signal beam to have different polarizations. For example, the optics can include a polarizing beam splitter positioned to separate the first-mentioned portion of the reference beam from the second portion of the reference beam and separate the first-mentioned portion of the near-field signal beam from second portion of the near-field signal beam. The optics can further include a retardation plate, e.g., a half-wave plate, the polarizing beam splitter being positioned between the retardation plate and the detectors.

Also, in embodiments having the first and second detectors, the system can further include an electronic processor coupled to the first-mentioned detector and the second detector, wherein during operation the electronic processor analyzes signals produced by the detectors to determine a memory state of the optical storage medium at the location illuminated by the near-field probe beam.

The system can further include the optical storage medium, wherein the optical storage medium includes multiple domains, at least some of the domains altering the polarization of an incident beam. For example, the optical storage material can be a magneto-optic material.

The system can further include the optical storage medium, wherein the optical storage medium has multiple domains, at least some of the domains defined by a variation in complex refractive index.

The optical storage medium can transmit a portion of the near-field probe beam to define the near-field signal beam. The system can further include a second mask positioned to receive the near-field signal beam, the second mask including at least one aperture having a dimension smaller than the wavelength of the input beam, wherein the aperture in the second mask is configured to couple the near-field signal beam to the optics. The optics can include a spatial filter positioned before the detector, the spatial filter including a pinhole aligned with the detector element, and imaging optics positioned to image at least a portion of the near-field signal beam onto the pinhole. For example, the portion of the near-field signal beam imaged onto the pinhole can be that emerging from the aperture in the second mask.

Alternatively, the optical storage medium can scatter at least a portion of the near-field probe beam to define the near-field signal beam, and the mask aperture can be configured to couple the near-field signal beam to the optics. In such a case, the optics and the beam splitter can be positioned to direct the at least a portion of the reference beam and the at least a portion of the near-field signal beam to interfere at the detector element. Furthermore, the mask aperture can scatter another portion of the measurement beam to define a background return beam, and the optics can direct the at least a portion of the reference beam, the at least a portion of the near-field signal beam, and at least a portion of the background return beam to interfere at the detector element. In such a case, the mask can further include a scattering site adjacent the aperture, the scattering site having a dimension smaller than the wavelength of the input beam. During operation the scattering site scatters an additional portion of the measurement beam to define a second background return beam, the detector includes a second element responsive to optical energy, and the optics are positioned to direct another portion of the reference beam and at least a portion of the second background return beam to interfere at the second detector element.

The mask can include a plurality of apertures each having a dimension smaller than the wavelength of the input beam, wherein each aperture is configured to couple a portion of the measurement beam to the optical storage medium to define a near-field probe beam for the aperture, the optical storage medium interacting with the near-field probe beams to define corresponding near-field signal beams. In such a case, the detector includes a plurality of elements each responsive to optical energy, each near-field signal beam having a corresponding detector element, and the optics direct at least a portion of each near-field signal beam and a portion of the reference beam to interfere at the corresponding detector element.

In embodiments having the first and second detectors, the mask can include a plurality of apertures each having a dimension smaller than the wavelength of the input beam, wherein each aperture is configured to couple a portion of the measurement beam to the optical storage medium to define a near-field probe beam for the aperture, the optical storage medium interacting with the near-field probe beams to define corresponding near-field signal beams. The first and second detectors then each include a plurality of elements each responsive to optical energy, each near-field signal beam having a corresponding detector element for each of the first and second detectors, and the optics direct a first portion of each near-field signal beam and a first portion of the reference beam to interfere at the corresponding detector element for the first detector and direct a second portion of each near-field signal beam and a second portion of the reference beam to interfere at the corresponding detector element for the second detector.

The optics in the system can define a confocal imaging system.

The optics can include a spatial filter positioned before the detector, the spatial filter including a pinhole aligned with the detector element, and imaging optics positioned to image at least a portion of the near-field signal beam emerging from the aperture onto the pinhole.

The system can further include a stage for supporting the optical storage medium and at least one of a scanner and a stepper coupled to the stage for adjusting the position of the optical storage medium relative to the near-field probe beam. The system can further include an electronic processor coupled to the detector and the at least one of the scanner and the stepper, wherein during operation the electronic processor analyzes at least one signal generated by the detector element as a function of the relative stage position. Furthermore, the system can include a pulsed source which during operation generates the input beam, wherein the electronic processor is coupled to the pulse source to synchonize the stage adjustments.

The beam splitter and the mask in the system can be positioned to cause the measurement beam to contact the mask at substantially normal incidence. Alternatively, the beam splitter and the mask can be positioned to cause the measurement beam to contact the mask at an angle of incidence greater than 10°.

The aperture can be defined by a hole in the mask. Alternatively, the mask can include a first material having a first complex refractive index and a second material having a second complex refractive index different from the first complex refractive index, the second material defining the aperture. Also, the mask can include a waveguide defining the aperture. Also, the mask can include a first reflective material and a second dielectric material defining the aperture. Also, where the mask includes a scattering site, the mask can include a reflective first material and a second material having optical properties different from those of the first material, the second material defining the scattering site.

The system can further include a phase shifter positioned to shift the phase of the reference beam relative to the phase of the measurement beam. For example, the phase shifter can be positioned along the path of the reference beam. The system can further include an electronic processor coupled to the detector and the phase shifter, wherein during operation the electronic processor sets the phase shift imparted by the phase shifter to each of multiple values and analyzes a signal generated by the detector element for each of the multiple values. Also, the system can further include an electronic processor coupled to the detector and the phase shifter, wherein during operation the electronic processor causes the phase shift $\chi$ imparted by the phase shifter to be modulated according to $\chi=\chi_0+\chi_1 \cos \omega t$, where $\chi_1 \neq 0$, t is time, and $\omega$ is the modulation frequency, and analyzes a signal generated by the detector element with respect to the modulation frequency.

The system can further include a source for generating the input beam. For example, the source can include a modulator producing a difference frequency $\omega$ between two components of the input beam. Also, the source may cause the two components of the input beam to have orthogonal polarizations. The system can further include an electronic processor coupled to the detector and the modulator, wherein the frequency difference $\omega$ produces a phase difference $\omega t$ between the two components of the input beam, where t is time, and wherein the electronic processor analyzes a signal produced by the detector with respect to the phase difference $\omega t$. The source can be a pulsed source, wherein the electronic processor is coupled to the pulsed source to synchronize the signal analysis with the phase difference $\omega t$.

The system can further include a source for the input beam and the source can cause the input beam to have one of multiple wavelengths. Furthermore, the system can include an electronic processor coupled to the detector and the source, wherein the electronic processor analyzes a signal produced by the detector for each of the multiple wavelengths of the input beam.

The system can further include a retardation plate positioned along the path of the input beam and configured to adjustably control the polarization of the input beam. The system can further include an electronic processor coupled to the detector and the retardation plate and wherein during operation the electronic processor causes the retardation plate to impart each of multiple polarizations to the input beam and analyzes a signal generated by the detector element for each of the multiple polarizations.

The system can further include: a source for the input beam; an electromagnet positioned adjacent the optical storage medium; and a write beam source positioned to direct at least a portion of a write beam to the mask aperture, the mask aperture configured to couple at least a portion of the write beam to the optical storage medium to define a near-field write beam. In such a case, the optical storage medium can be a magneto-optic material, and the system can further include an electronic controller coupled to each of the electromagnet and the write beam source for controllably causing the reversal of a magneto-optic domain illuminated by the near-field write beam in the optical storage medium. The system can further include the optical storage medium. In some embodiments, the write beam source can adjustably occupy the detector position, thereby adjustably permitting the optics to direct the at least a portion of the write beam to the mask aperture. The near-field write beam can interfere with the near-field probe beam to cause the reversal of the magneto-optic domain.

In general, in another aspect, the invention features a method for reading information from an optical storage medium including: separating an input beam into a measurement beam and a reference beam; directing the measurement beam to a mask including at least one aperture having a dimension smaller than the wavelength of the input beam, wherein the mask aperture couples at least a portion of the measurement beam to the optical storage medium to define a near-field probe beam, the storage medium interacting with the near-field probe beam to define a near-field signal beam; and measuring optical interference between at least a portion of the reference beam and at least a portion of the near-field signal beam. The method can further include features corresponding to any of the features of the optical storage system described above.

In general, in another aspect, the invention features an optical storage system including: a write beam source providing at least one write beam; a reference beam source providing at least one reference beam; an optical storage medium; a mask having an aperture positioned to couple at least a portion of the at least one write beam and at least a portion of the at least one reference beam to the optical storage medium, the aperture having a dimension smaller than the wavelength of the at least one write beam; a confocal imaging system positioned to couple the at least one write beam and the at least one reference beam to the mask; and an electromagnet positioned adjacent the optical storage medium. The optical storage system can further include a phase shifter positioned to adjust the phase of the at least one reference beam relative to the at least one write beam. The mask can include multiple apertures each having a dimension smaller than the wavelength of the at least one write beam.

In general, in another aspect, the invention features an optical system including: a beam splitter positioned to separate an input beam into a measurement beam and a reference beam; a mask positioned to receive the measurement beam, the mask including at least one aperture having a dimension smaller than the wavelength of the input beam, wherein the mask aperture is configured to couple at least a portion of the measurement beam to a sample to define a near-field probe beam, the sample interacting with the near-field probe beam to define a near-field signal beam; a detector having an element responsive to optical energy; and optics positioned to direct at least a portion of the reference beam and at least a portion of the near-field signal beam to interfere at the detector element.

Embodiments of the invention may include any of the following advantages.

One advantage is that the interferometric analysis of the near-field signal beam can improve the signal-to-noise of the near-field information, e.g., the complex amplitudes of near-field beams scattered/reflected by a sample.

Another advantage is that the interferometric analysis can reveal changes in the phase or complex amplitude of near-field signal beams as a function of sample location.

Another advantage is that the confocal features of the systems and methods can remove background contributions from the signal of interest.

Another advantage is that the systems and methods can operate in a continuous scan mode with a pulsed input optical beam.

Another advantage is that in embodiments operating in a reflection mode, each mask aperture couples a near-field probe beam to the sample and couples a near-field signal beam toward the detector. Thus, each mask aperture is both a transmitter and receiver for a corresponding near-field beam, thereby improving lateral resolution. As a further result, the directions of propagation of the components of each near-field probe beam that produce a corresponding near-field signal beam at a given volume section of the sample are substantially the same, thereby simplifying an inverse calculation for properties of the sample using the complex amplitude of the near-field signal beam from the interference signal(s).

Another advantage is that the sample can be profiled using substantially low order electric and magnetic multipole near-field sources, e.g., near-field probe beam sources including an electric dipole and two different orthogonal orientations of a magnetic dipole.

Another advantage is that effects of interference terms caused by a background beam scattered and/or reflected from the mask apertures can be compensated. The interference terms can include interference between the background beam and the reference beam, and the background beam and the near-field signal beam.

Another advantage is that statistical errors in measured amplitudes and phases of the near-field signal beams can be substantially the same as statistical errors based on Poisson statistics of the reflected/scattered near-field probe beams. In other words, the measured amplitudes and phases are not significantly degraded by the presence of background signals.

Another advantage is that the sample properties can be analyzed by using multiple wavelengths.

Another advantage is that the separation between the mask and the sample can be varied to measure the radial dependence of the amplitudes and phases of the near-field signal beams.

Another advantage is that the relative lateral position of the mask and the sample can be varied to measure the angular dependence of the amplitudes and phases of the near-field signal beams.

Another advantage is that the spatial resolution of the system is defined primarily by the dimensions of the mask apertures and their distance from the sample, and is only weakly dependent on the optical system imaging the near-field signal beams emerging from the mask apertures onto the detector array.

Another advantage is that the sample scanning may be implemented in a "step and repeat" mode or in a continuous scan mode.

Another advantage is that a source of the near-field probe beam may be a pulsed source, which may be synchronized with the sample scanning.

Another advantage is that by using a mask with an array of apertures, multiple interference terms can be measured substantially simultaneously for a one-dimensional or a two-dimensional array of locations on the sample. Furthermore, background noise in the multiple interference terms are correlated to one another.

Another advantage is that a given state of magnetization at the region of the sample illuminated by the near-field probe beam can be measured based on the polarization rotation of the near-field signal beam.

Another advantage is that the system can be used to write to an optical data storage medium such as a magneto-optical material.

Another advantage is that the system can profile a surface and internal layers near the surface of an object being profiled/imaged without contacting the object.

Another advantage is that either optical heterodyne or homodyne techniques may be used to measure amplitudes and phases of interference terms between the reference beam and the near-field signal beams.

Another advantage is that the complex refractive index of the sample at a location illuminated by the near-field probe beam can be determined from measured arrays of interference data corresponding to the near-field signal beams, wherein the dimensionality of the arrays may comprise one or two dimensions corresponding to one and two dimensions of space, a dimension for the spatial separation of the mask and the sample, a dimension for each of wavelength of components of the near-field probe beam source, and a dimension for the multipole characterization of the near-field probe beam.

Another advantage is that multiple layers of optical data stored on and/or in an optical storage medium can be read by measuring interference data for multiple separations between the mask and the sample.

Another advantage is that multiple layers of optical data stored on and/or in an optical storage medium can be read substantially simultaneously by measuring interference data for multiple wavelengths of the near-field probe beam, and/or different polarizations of the near-field probe beam.

Another advantage is that the mask can include sub-wavelength apertures in a sub-wavelength thick conducting layer, wavelength and sub-wavelength Fresnel zone plate(s), microlenses, and/or gratings to alter the properties of the near-field probe beam(s).

Another advantage is that a change in temperature of a site in or on the sample can be detected as a corresponding change in the complex value of the index of refraction.

Other aspects, features, and advantages follow.

BRIEF DESCRIPTION OF THE DRAWINGS

In the drawings, wherein like reference characters denote similar elements throughout the several views:

FIGS. 7a–7c relate to lithography and its application to manufacturing integrated circuits wherein FIG. 7a is a schematic drawing of a lithography exposure system using the interferometric near-field confocal microscopy system;

FIGS. 7b and 7c are flow charts describing steps in manufacturing integrated circuits;

DETAILED DESCRIPTION

Figure 1A:
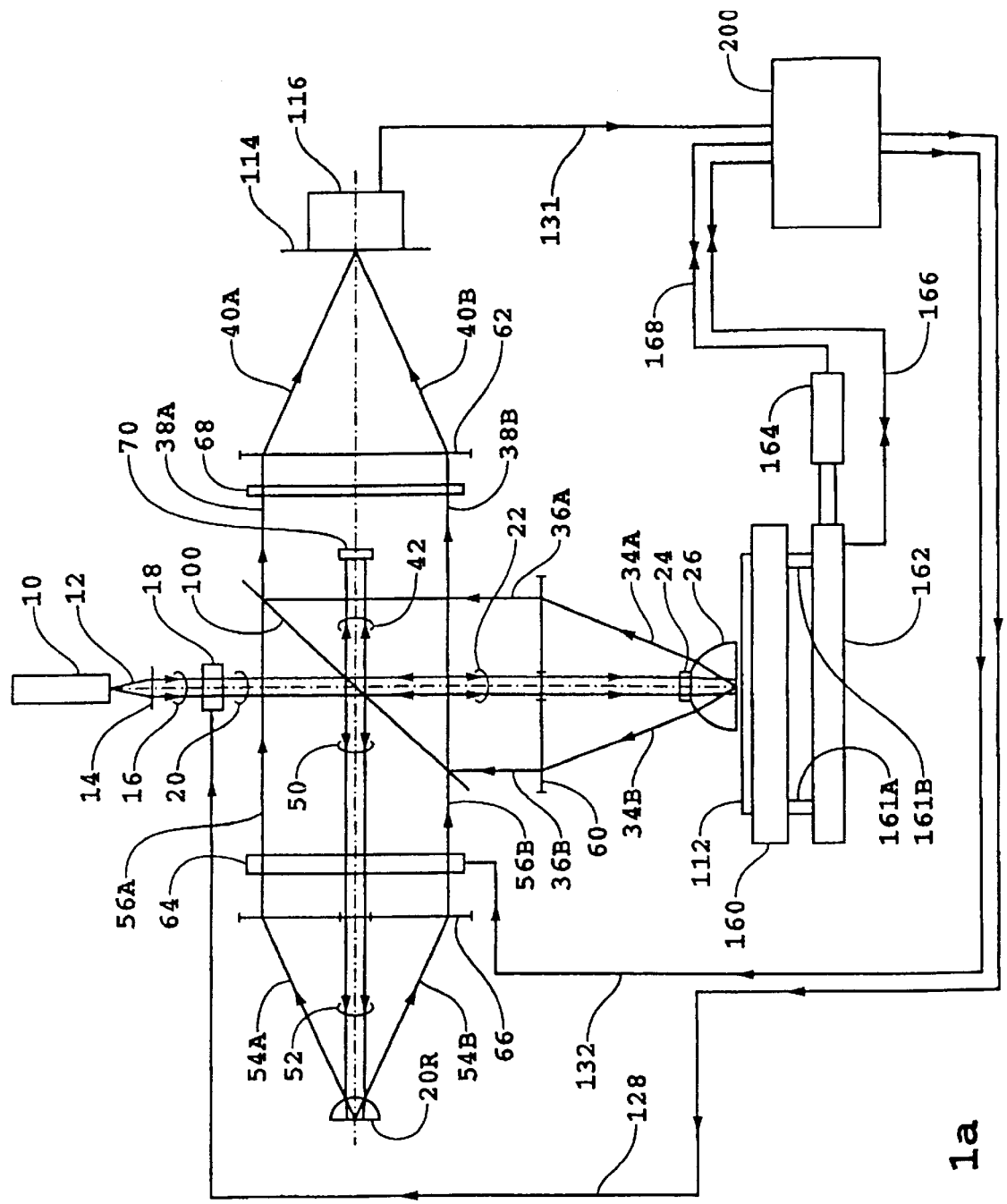
FIG. 1a illustrates, in schematic form, the first embodiment of the present invention.

Referring to the drawings in detail, FIG. 1a depicts in schematic form the first embodiment of the present invention. As shown in FIG. 1a, the first embodiment comprises an interferometer, a source 10, object material 112, object material chuck 160, chuck stage 162, translator 164, reference object 20R, and detector 116. The configuration of the interferometer is known in the art as a Michelson interferometer, and is shown as a simple illustration. Other forms of interferometer known in the art such as a polarized Michelson interferometer and as described in an article entitled "Differential Interferometer Arrangements for Distance and Angle Measurements: Principles, Advantages, and Applications," by C. Zanoni (VDI Berichte NR. 749, pp. 93–106, 1989) may be incorporated into the apparatus of FIG. 1a without departing from the spirit and scope of the present invention.

For the first embodiment, light source 10 is preferably a point source or a source of radiation spatially incoherent across the surface of the source, preferably a laser or like source of coherent or partially coherent radiation, and preferably linearly polarized. Light source 10 emits input beam 12. As shown in FIG. 1a, input beam 12 enters collimating lens 14 to form input beam 16. Input beam 16 is transmitted by a phase retardation plate 18 as input beam 20. The plane of polarization of input beam 20 is rotated by phase retardation plate 18 to be either parallel or orthogonal to the plane of FIG. 1a. However, other orientations of the plane of polarization of input beam 20 may be beneficially used in certain end use applications. The function of phase retardation plate 18 is controlled by signal 128 from electronic controller, signal processor, and computer 200.

Input beam 20 is incident on a non-polarizing beam splitter 100 and a first portion thereof is transmitted as a measurement beam 22. A second portion of input beam 20 incident on beam splitter 100 is reflected as reference beam 50. Measurement beam 22 is transmitted through an aperture in lens 60 and incident on a lens assembly comprising lenses 24 and 26.

Figure 4A:
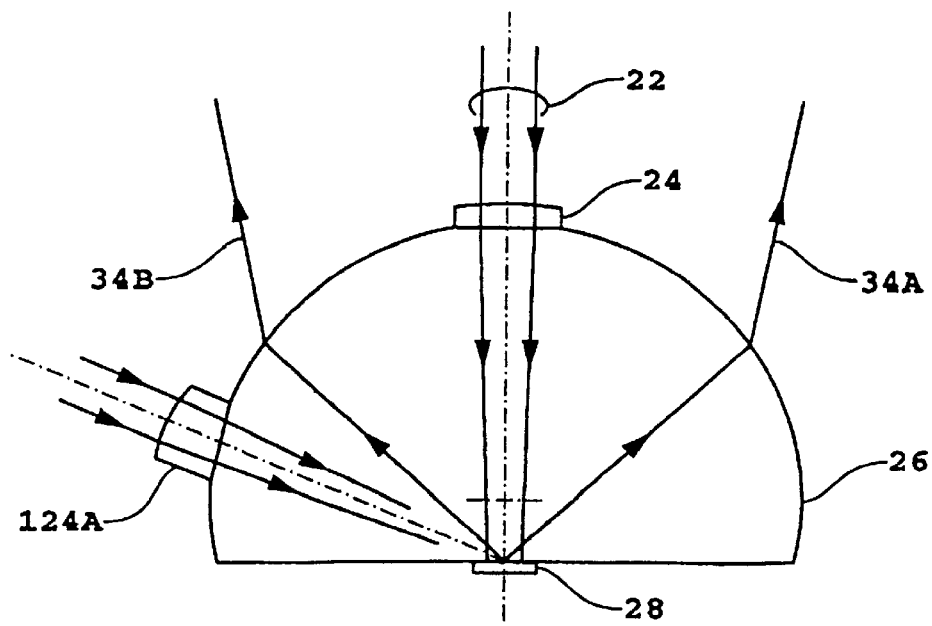
FIG. 4a illustrates, in schematic form, the lens assembly comprising Amici type objective lens 26 and lens 24, as used in the first embodiment, and the lens assembly comprising Amici type objective lens 26 and lens 124, as used in the second embodiment.

The propagation of measurement beam 22 through the lens assembly is shown schematically in an expanded form in FIG. 4a. Lens 26 is an Amici type objective lens. Measurement beam 22 is focused by the lens assembly to a beam diameter at element 28 that encompasses an array of at least one sub-wavelength aperture and at least one sub-wavelength scattering site in element 28. Element 28 shown schematically in FIG. 4b in an expanded form is a conducting layer on a surface of Amici type objective lens 26. Element 28 can be generally thought of as a mask.

Figure 4B:
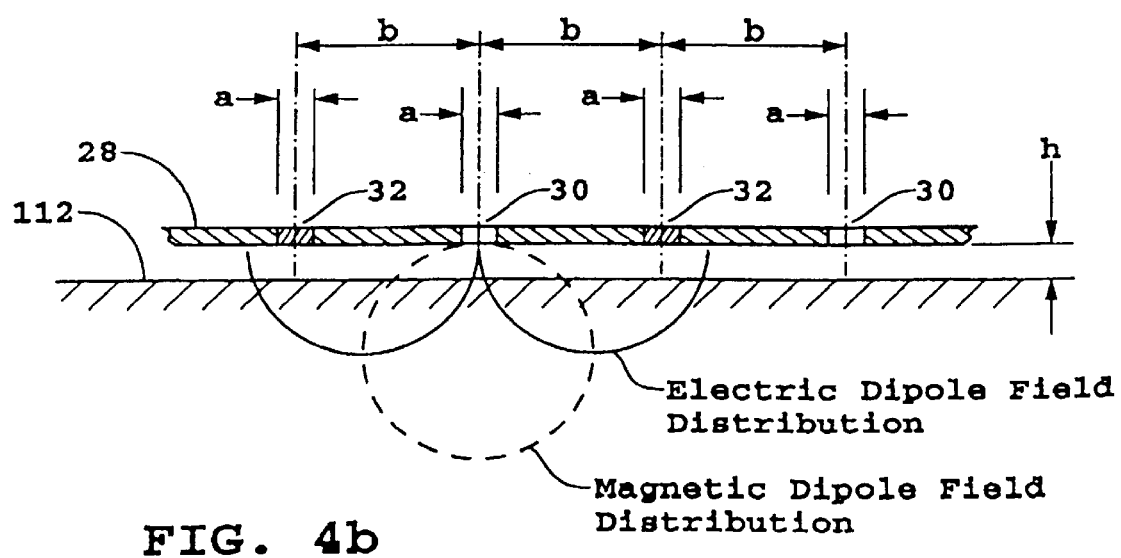
FIG. 4b illustrates, in schematic form, conducting element 28 in relation to object material 112 being profiled/imaged and angular distribution functions of electric far field components associated with an electric dipole and a magnetic dipole located at a sub-wavelength aperture 30.

The sub-wavelength apertures and the sub-wavelength scattering sites are elements 30 and 32, respectively, as indicated in FIG. 4b. Sub-wavelength scattering sites 32 are preferably non-transmitting conducting elements with a complex index of refraction different from the complex index of refraction of the conducting material of element 28. The complex indices of refraction are different so that elements 32 effectively serve as sub-wavelength scattering sites. The diameter of elements 30 and 32 is a with $a<\lambda$, preferably $a<<\lambda$, where $\lambda$ is the wavelength of measurement beam 22. The separation of elements 30 and 32 is b with $b>a$, preferably $b>>a$. The thickness of conducting material of element 28 is of the order of 20 nm and chosen so that the fraction of the probe beam transmitted by sections of element 28 not containing sub-wavelengths 30 is $<<1$.

The relative spacing of elements 30 in element 28 is further selected to minimize the effect of one sub-wavelength aperture on the transmission properties a second sub-wavelength aperture.

The diameters of sub-wavelength apertures 30 need not be restricted to a single diameter as shown schematically in FIG. 4b but may beneficially comprise two or more diameters for an end use application. Further, the shapes of sub-wavelength apertures 30 may comprise shapes other than circular, e.g., squares or rectangles without departing from the spirit and scope of the present invention.

Moreover, the spacing of sub-wavelength apertures 30 need not be restricted to a single value as shown schematically in FIG. 4b but may beneficially comprise two or more different spacings for an end-use application without departing from the spirit and scope of the present invention.

Further, the arrangement of sub-wavelength apertures 30 may be arranged in various geometric patterns or a random pattern without departing from the spirit and scope of the present invention.

The apertures 30 in element 28 can be formed as holes in a mask or as transmissive dielectric regions in an otherwise non-transmissive mask, e.g., transmissive vias in an otherwise reflective element. Moreover, the dielectric material in element 28 defining the apertures 30 can form a waveguide or optical cavity that enhances the transmission of the near-field probe beam to the sample. See, e.g., the previously cited provisional applications "Multiple-Source Arrays For Confocal And Near-Field Microscopy" and "Multiple-Source Arrays with Optical Transmission Enhanced by Resonant Cavities." Furthermore, in the presently described embodiment, the mask portion of element 28 is described as conducting to indicate that it is reflective. In other embodiments, element 28 is not necessarily conductive, but is, generally, not transmissive, with the coupling of the near-field probe beams to the sample being accomplished by the apertures 30 in element 28.

The sub-wavelength apertures may further comprise a Fresnel zone plate or a microlens to alter beneficially in certain end use applications the transmission through an array of sub-wavelength apertures without departing from the spirit and scope of the present invention. In certain other end use applications, gratings may be added to an array of wavelength/sub-wavelength apertures operating as spatial filters of reflected/scattered or transmitted near-field probe beam(s) to alter properties of the reflected/scattered or transmitted near-field probe beam(s) without departing from the spirit and scope of the present invention.

A first portion of the measurement beam incident on sub-wavelength apertures 30 is transmitted as a near-field probe beam. A portion of the near-field probe beam is incident on object material 112 and a portion thereof is reflected and/or scattered back to the sub-wavelength apertures 30, and a portion thereof is transmitted as a near-field return probe beam. The spatial separation of adjacent surfaces of object material 112 and conducting element 28 is h as indicated in FIG. 4b. The value of h is preferably of the order of 2a. A second portion of the measurement beam incident on sub-wavelength apertures 30 is reflected and/or scattered as a first background return beam. A portion of the measurement beam incident on sub-wavelength scattering sites 32 is reflected and/or scattered as a second background return beam. The near-field return probe beam, the first background return beam, and the second background return beam exit Amici type objective lens 26 as return beam 34 shown as rays 34A and 34B in FIGS. 1a and 4a wherein return beam 34 comprises rays between rays 34A and 34B. Return beam 34 is collimated by lens 60 as return beam 36 shown as rays 36A and 36B in FIG. 1a, wherein beam 36 comprise rays between rays 36A and 36B.

A portion of the measurement beam not incident on sub-wavelength apertures 30 and scattering sites 32 is reflected as a return measurement beam. The return measurement beam exits lens 24 as a beam substantially parallel to measurement beam 22 and a portion thereof is reflected as a return measurement beam component of beam 42. Beam 42 is incident on and substantially occulted by stop 70.

Reference beam 50 is transmitted by a phase shifter 64, transmitted by an aperture in lens 66, incident on reference object 20R, and reflected as reflected reference beam 54 shown as rays 54A and 54B in FIG. 1a wherein beam 54 comprises rays between rays 54A and 54B. Beam 54 is collimated by lens 66 and transmitted by phase shifter 64 as a reflected reference beam 56 shown as rays 56A and 56B in FIG. 1a, wherein beam 56 comprises rays in between rays 56A and 56B. Phase shifter 64 introduces a relative phase shift $\chi$ in the reflected reference beam 56 as a result of the two transits of reference beam 50 through phase shifter 64. The magnitude of phase shift $\chi$ is controlled by control signal 132 from electronic controller, signal processor, and computer 200.

Figure 4C:
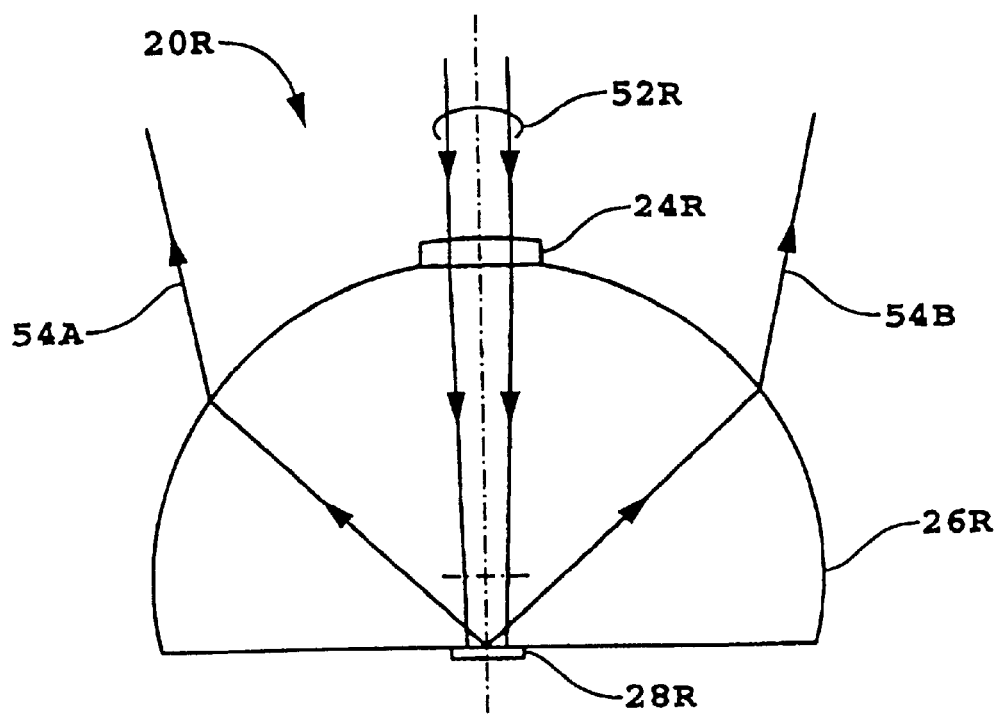
FIG. 4c illustrates, in schematic form, the reference object 20R comprising Amici type objective lens 26R and lens 24R, as used in the first embodiment.
Figure 4D:
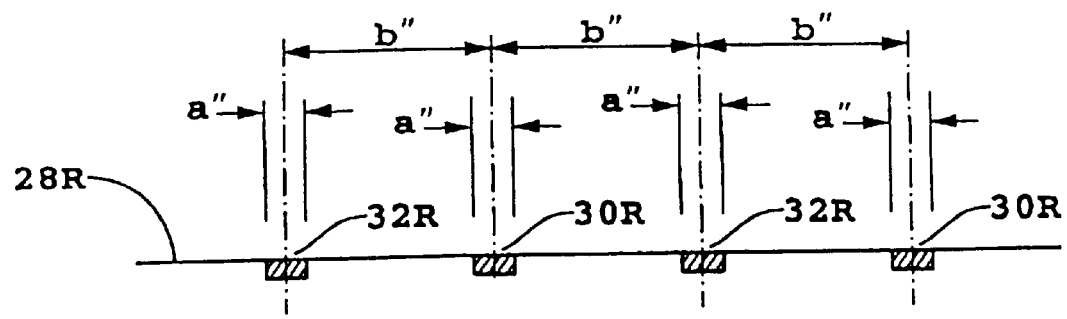
FIG. 4d illustrates, in schematic form, element 28 comprising reflecting elements 30R and 32R used in reference object 20R.

The propagation of reference beam 52 through reference object 20R is shown schematically in an expanded form in FIG. 4c. Reference object 20R is an Amici type objective lens. Reference beam 52 is focused by reference object 20R to a beam diameter at element 28R that encompasses an array of at least two wavelength or sub-wavelength reflecting spots on element 28R. Element 28R is shown schematically in FIG. 4d in an expanded form as an array of reflecting spots 30R and 32R on a surface of Amici type objective lens 26R. Reflecting spots 30R and 32R generate reflected reference beam components of beam 54 that correspond to elements 30 and 32, respectively, of element 28. The spacing of the reflective spots 30R and 32R and the focal length of lens 66 are chosen such that reflective spots 30R and 32R and elements 30 and 32, respectively, are conjugates as seen by a subsequent imaging onto a detector. The diameter a" of the reflective spots 30R and 32R is chosen to efficiently generate reflected reference beam 56 with a diameter substantially the same as the diameter of return beam 36. The relative reflectivities of reflecting spots 30R and 32R may be the same or beneficially different depending on an end use application.

It will be evident to those skilled in the art that the path of the reference beam could be configured such that the reference beam is transmitted by a reference object 20R having an element which is complimentary to element 28R of the first embodiment without departing from the spirit and the scope of the present invention. Examples of the generation of a reference beam by transmitting beams through wavelength and/or sub-wavelength apertures is described in cited U.S. Provisional Application by Hill entitled "Multiple-Source Arrays With Optical Transmission Enhanced By Resonant Cavities." Moreover, in other embodiments, the reference object can be uniform reflective object, such as a flat or curved mirror, although such embodiments may couple less of the reference beam to interfere with the near-field signal beams than in the presently described embodiment.

Return beam 36 is incident on beam splitter 100 and a portion thereof is reflected as a return beam component of beam 38 shown as rays 38A and 38B in FIG. 1a, wherein beam 38 comprises rays between rays 38A and 38B. Reflected reference beam 56 is incident on beam splitter 100 and a portion thereof is transmitted as a reflected reference beam component of beam 38. Beam 38 is mixed with respect to polarization by polarizer 68, then incident on lens 62, and focused as mixed beam 40 shown as rays 40A and 40B in FIG. 1a, wherein mixed beam 40 comprises rays between rays 40A and 40B. Mixed beam 40 is focused onto a pinhole plane 114 such that a pinhole in image plane 114 is a conjugate image of either one of the sub-wavelength apertures 30 or one of sub-wavelength scattering points 32.

Figure 5:
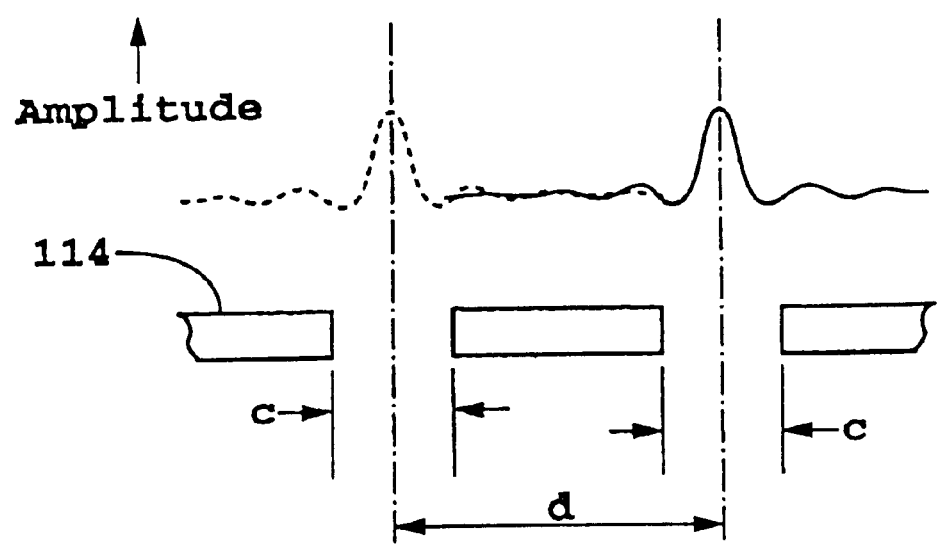
FIG. 5 illustrates, in schematic form, image plane 114 and amplitude distribution functions for images of a sub-wavelength aperture 30 and a sub-wavelength scattering site 32 at respective pinholes in image plane 114.

Pinhole plane 114 is shown schematically in FIG. 5. The diameter of the pinholes is c and the spacing between the pinholes is d. The spacing d is equal to the separation b of sub-wavelength apertures 30 and sub-wavelength scattering sites 32 times the magnification of the imaging system imaging the sub-wavelength apertures 30 and sub-wavelength scattering points 32 onto corresponding pinholes in pinhole plane 114. Diameter c is selected to be approximately twice the size of a diffraction limited image of a point object by the imaging system and the spacing d is selected to be larger than c, preferably $\geq$ to approximately four times the size of a diffraction limited image of a point object by the imaging system. Typical amplitude functions of diffraction limited images of sub-wavelength apertures 30 and sub-wavelength scattering sites 32 are shown in FIG. 5 as a dashed and solid profiles, respectively.

A portion of mixed beam 40 is transmitted by the pinholes in pinhole plane 114 and detected by a detector 116, preferably by a quantum photon detector. Detector 116 comprises an array of pixels, comprising either a pair of pixels, a one dimensional array of pixels, or a two dimensional array of pixels according to the requirements of an end-use application, with a one-to-one mapping of pinholes in pinhole plane 114 to the pixels of detector 116. Detector 116 generates an electrical interference signal comprising an array of signal values $[S_n]$ corresponding to the array of pixels. Subscript n is an index indicating an element in the array of signal values $[S_n]$. The array of signal values $[S_n]$ may comprise a pair of elements, a one-dimensional array comprising at least three elements, or a two-dimensional array depending on an end-use application.

The array of signal values $[S_n]$ may be written to a good approximation as $$[S_n] = [(S_D + S_I)_n] \tag{1}$$

where term $(S_D)_n$ represents terms either associated with sub-wavelength apertures 30 or associated with sub-wavelength apertures 32 and term $(S_I)_n$ represents interference cross terms either associated with sub-wavelength apertures 30 or associated with sub-wavelength apertures 32.

A $(S_D)_n$ term associated with sub-wavelength apertures 30 is proportional to the sum of the squares of the amplitudes of the corresponding portions of the near-field return probe beam, of the first background return beam, and of the reflected reference beam and interference cross terms between complex amplitudes of the near-field return probe beam and of the first background return beam. A $(S_D)_n$ term associated with sub-wavelength apertures 32 is proportional to the sum of the squares of the amplitudes of the corresponding portions of the second background return beam and of the reflected reference beam. A $(S_I)_n$ term associated with sub-wavelength apertures 30 is proportional to the sum of the interference cross terms between complex amplitudes of the near-field return probe beam and of the reflected reference beam and between complex amplitudes of the first background return beam and of the reflected reference beam. A $(S_I)_n$ term associated with sub-wavelength apertures 32 is proportional to the interference cross term between complex amplitudes of the second background return beam and of the reflected reference beam.

Term $(S_D)_n$ is independent of phase shift $\chi$. Term $(S_I)_n$ is a sinusoidal function of phase shift $\chi$ and may be written as $$(S_I)_n = (|S_I| \cos(\phi + \chi))_n \qquad (2)$$

where $(|S_I|)_n$ and $\phi$ are an amplitude and phase, respectively, related to the complex amplitudes contributing to $(S_I)_n$.

Operation of the apparatus of the first embodiment of the present invention depicted in FIGS. 1*a*, 4*a*, and 4*b* is based on the acquisition of a sequence of four measurements of arrays of signal values. The sequence of the four arrays of signal values $[S_n]_1$, $[S_n]_2$, $[S_n]_3$, and $[S_n]_4$ is obtained by detector 116 with phase shifter 64 introducing a sequence of phase shifts $\chi_0$, $\chi_0 + \pi$, $\chi_0 + \pi/2$, and $\chi_0 + 3\pi/2$ radians, respectively, where $\chi_0$ is some fixed value of phase shift $\chi$. The four arrays of signal values $[S_n]_1$, $[S_n]_2$, $[S_n]_3$, and $[S_n]_4$ are sent to electronic controller, signal processor, and computer 200 as signal 131, in either digital or analog format, for subsequent processing.

Conventional conversion circuitry, i.e., analog-to-digital converters, is included in either detector 116 or electronic controller, signal processor, and computer 200 for converting the four arrays $[S_n]_1$, $[S_n]_2$, $[S_n]_3$, and $[S_n]_4$ to a digital format. Phase shift $\chi$ introduced by phase shifter 64 is controlled by signal 132 where signal 132 is generated and subsequently transmitted by electronic controller, signal processor, and computer 200. Phase shifter 64 can be of an electro-optical type.

Next, two arrays of signal value differences $[S_n]_1 - [S_n]_2 = [(S_I)_n]_1 - [(S_I)_n]_2$ and $[S_n]_3 - [S_n]_4 = [(S_I)_n]_3 - [(S_I)_n]_4$ are computed by electronic controller, signal processor, and computer 200.

Elements of the arrays of signal value differences corresponding to pixels that are associated with sub-wavelength apertures 30 contain substantially and with relatively high efficiency only two interference cross terms, a first interference cross term between the complex amplitude of the near-field return probe beam and of the complex amplitude of the reflected reference beam and a second interference cross term between the complex amplitude of the first background return beam and of the complex amplitude of the reflected reference beam.

Elements of the arrays of signal value differences corresponding to pixels that are associated with sub-wavelength scattering sites 32 contain substantially and with relatively high efficiency only the interference cross term between the complex amplitude of the second background return beam and of the complex amplitude of the reflected reference beam.

The relatively high efficiency for isolation of effects of amplitudes of beams associated with sub-wavelength apertures 30 and sub-wavelength scattering sites 32 in the measured intensity values is controlled by the choice of parameters c and d.

The complex amplitude of the near-field return probe beam is computed by electronic controller, signal processor, and computer 200 from the amplitude of the first interference term between the complex amplitude of the near-field return probe beam and the amplitude of the reflected reference beam. The computation comprises using measured values of the interference cross terms between components of the complex amplitude of the second background return beam and components of the complex amplitude of the reflected reference beam to compensate the measured values of elements of signal value differences associated with sub-wavelength apertures 30 for the contribution of the second interference cross terms between components of the complex amplitude of the first background return beam and components of the complex amplitude of the reflected reference beam. The computation further comprises using measured values for the square of the amplitudes of the portions of the reflected reference beam transmitted by the pinholes of pinhole plane 114 and detected by detector 116.

Next, the plane of polarization of input beam 20 is rotated by 90° by phase retardation element 18 in response to signal 128 from electronic controller, signal processor, and computer 200. A second set of four arrays of signal values $[S_n]_5$, $[S_n]_6$, $[S_n]_7$, and $[S_n]_8$ corresponding to measured arrays of signal values $[S_n]_1$, $[S_n]_2$, $[S_n]_3$, and $[S_n]_4$ are obtained by detector 116. Arrays of signal value differences $[S_n]_1 - [S_n]_2 = [(S_I)_n]_1 - [(S_I)_n]_2$ and $[S_n]_3 - [S_n]_4 = [(S_I)_n]_3 - [(S_I)_n]_4$ are computed by electronic controller, signal processor, and computer 200. The complex amplitude of the near-field return probe beam for the orthogonally polarized input beam 20 is computed by electronic controller, signal processor, and computer 200 by the same algorithm as used to compute the complex amplitude of the near-field return probe beam for the non-rotated state of polarization of input beam 20.

Object material 112 is mounted on an object chuck 160. The angular orientation and height of object chuck 160 is controlled by three transducers, two of which are shown as 161A and 161B, that are attached to chuck stage 162. The angular orientation and height of object material 112 relative to the surface of conducting element 28 are detected and used to generate error signals. The detection and generation of error signals may be by known techniques in the art such as capacitive or "cap" gauges, precision distance measuring interferometry including wave domain reflectometry [see, e.g., commonly owned U.S. patent application with Ser. No. 09/089,105 and entitled "Methods And Apparatus For Confocal Interference Microscopy Using Wavenumber Domain Reflectometry And Backgroung Amplitude Reduction And Compensation" by Henry A. Hill] and scanning interferometric near-field microscopy [see, e.g., previously cited provisional application entitled "Control of Position and Orientation of Sub-Wavelength Aperture Array in Near-field Scanning Microscopy."] The error signals are transmitted as a component of signal 166 to electronic controller, signal processor, and computer 200. Servo control signals are generated by electronic controller, signal processor, and computer 200 from the error signals and transmitted as a servo control signal component of signal 166 to chuck stage 162. Transducers 161A, 161B, and the third transducer (not shown) alter the orientation and/or height of object material 112 according to the servo control signal component of signal 166.

The location of chuck stage 162 in a plane substantially parallel to the surface of conducting element 28 is controlled by translator 164. The location of chuck stage 162 is detected by known techniques in the art such as precision distance measuring interferometry and error signals transmitted as an error signal component of signal 168 to electronic controller, signal processor, and computer 200. [See, e.g., U.S. patent application with Ser. No. 09/252,266 entitled "Interferometer And Method For Measuring The Refractive Index And Optical Path Length Effects Air" by Peter de Groot, Henry A. Hill, and Frank C. Demarest filed Feb. 18, 1999 and U.S. patent application with Ser. No. 09/252,266 entitled "Apparatus And Method For Measuring The Refractive Index And Optical Path Length Effects Of Air Using Multiple-Pass Interferometry" by Henry A. Hill, Peter de Groot, and Frank C. Demarest filed Feb. 18, 1999. The contents of both applications are incorporated herein by reference.] Servo control signals are generated by electronic controller, signal processor, and computer 200 from the error signal component of signal 168 and transmitted as a servo signal component of signal 168 to translator 164. Translator 164 controls the location and orientation of chuck stage 162 in one or two orthogonal directions and in one or two orthogonal planes of orientation, according to the requirements of an end use application, in response to the servo signal component of signal 168.

Next, the object material 112 is scanned in a combination of one or two orthogonal directions substantially parallel to the surface of object material 112 and in the spatial separation of the conducting element 28 from the adjacent surface of object material 112 according to the requirements of an end-use application. Measured arrays of signal values $[S_n]_1$, $[S_n]_2$, $[S_n]_3$, and $[S_n]_4$ and, if required by an end-use application, measured arrays of signal values $[S_n]_5$, $[S_n]_6$, $[S_n]_7$, and $[S_n]_8$ are obtained as a function of the scanned parameters and the amplitudes and phases of the respective interference cross terms between the complex amplitude of the respective near field return probe beam and of the respective complex amplitude of the reflected reference beam computed by electronic controller, signal processor, and computer 200.

Information with apparatus of the first embodiment about object material 112 is acquired in the presence of a significantly reduced background signal. Sources of contributions to the background signal comprise the first background return beam, a portion of the return measurement beam-not occulted by stop 70, a background produced by reflection and/or scattering of other beams associated with the measurement beam in the apparatus of the first embodiment, and corresponding beams associated with the reflected reference beam. The background signal is significantly reduced first because the apparatus of the first embodiment comprises a confocal optical imaging/detecting system and second because of the background compensation procedure based on measurement of the second background return beam.

It is well known to those in the art that confocal optical imaging/detecting systems have significantly improved depth discrimination in relation to non-confocal optical imaging/detecting systems and therefore significantly improved discrimination against scattered/reflected beams generated in plane sections displaced from the plane section being imaged. However, confocal optical imaging/detecting systems do not discriminate against the first background return beam. The background compensation procedure based on measurement of the second background return beam compensates for the first background return beam that is not discriminated against by the confocal imaging/detecting properties of the apparatus of the first embodiment. It should be noted that the background compensation procedure based on measurement of the second background return beam further compensates for the scattered/reflected beams generated in plane sections displaced from the plane section being imaged not discriminated against by the confocal imaging/detecting properties of the apparatus of the first embodiment.

The scanning of object material 112 in a combination of one or two orthogonal directions substantially parallel to the surface of object material 112 and in the spatial separation of the conducting element 28 from the adjacent surface of object material 112 is implemented for the first embodiment as a "step and repeat" mode. The first embodiment modified for a continuous scanning mode of operation is subsequently described as the third variant of the first embodiment of the present invention.

A first variant of the first embodiment of the present invention comprises the same elements as the first embodiment of the present invention as shown schematically in FIG. 1a. The difference between the first variant of the first embodiment and the first embodiment is in the procedure used to acquire the measured arrays of signal values. In the first variant of the first embodiment, the amplitude $(|S_I|)_n$ and phase $(\phi)_n$ are determined using known heterodyne detection techniques or phase sensitive detection techniques for non-pulsed signals such as a digital Hilbert transform phase detector [see "Phase-locked loops: theory, design, and applications" 2nd ed. (McGraw-Hill, New York) 1993, by R. E. Best], a phase-locked loop [see R. E. Best, ibid.], a sliding window FFT [see *Digital Techniques for Wideband Receivers*, (Artech House, Boston) 1995, by J. Tsui using phase $\chi$ as the reference phase. It is known for a function sampled uniformly in time that an implementation of a phase sensitive technique based on digital signal processing for acquisition of information on the function yields results based on a Chebyshev polynomial representation of the function [see H. A. Hill and R. T. Stebbins, *Astrophys. J.*, 200, p 484 (1975)]. Consider the example of phase $\chi$ being scanned about an offset $\chi_0$ so that $$\chi = \chi_0 + \Delta\chi \tag{3}$$

where $\Delta\chi$ is some function of time t. The scanning of $\chi$ generates components in elements of an array of signal values according to the Eqs. (2) and (3) expressed as $$(S_I)_n = (|S_I| \cos(\phi+\chi_0))_n \cos \Delta\chi - (|S_I| \sin(\phi+\chi_0))_n \sin \Delta\chi. \tag{4}$$

The amplitude array $[(|S_I|)_n]$ and phase array $[(\phi+\chi_0)_n]$ are then obtained by way of phase sensitive detection of the coefficient arrays of $\cos \Delta\chi$ and $\sin \Delta\chi$. The phase sensitive detection comprises multiplying $(|S_I|)_n$ by $\cos \Delta\chi$ and integrating $(|S_I|)_n \cos \Delta\chi$ with respect to time and multiplying $(|S_I|)$ by $\sin \Delta\chi$ and integrating $(|S_I|)_n \sin \Delta\chi$ with respect to time. For the case of $\Delta\chi$ being a sinusoidal function at an angular frequency $\omega_1$ with an amplitude 1, i.e., $$\Delta\chi = \cos \omega_1 t \tag{5}$$

and $[(|S_I|)_n]$ sampled uniformly in time, the coefficient arrays of $\cos \Delta\chi$ and $\sin \Delta\chi$ can be expressed effectively as arrays of certain Chebyshev polynomial coefficients of $[(|S_I|)_n]$.

Elements of the arrays of certain Chebyshev polynomial coefficients can be expressed using known properties of Chebyshev polynomial as $$(|S_I|\cos(\phi+\chi_0))_n = \frac{4}{T[1+J_0(2)]} \int_{-T/2}^{T/2} (S_I)_n \cos\Delta\chi dt \qquad (6)$$

$$= \frac{4}{[1+J_0(2)]} \int_{-1}^{1} \frac{(S_I)_n T_1(\Delta\chi)}{[1-(\Delta\chi)^2]^{1/2}} d\Delta\chi,$$

$$(|S_I|\sin(\phi+\chi_0))_n = -\frac{4}{[1-J_0(2)]} \int_{-T/2}^{T/2} (S_I)_n \sin\Delta\chi dt \qquad (7)$$

$$= -\frac{4}{[1-J_0(2)]} \int_{-1}^{1} \frac{(S_I)_n V_1(\Delta\chi)}{[1-(\Delta\chi)^2]^{1/2}} d\Delta\chi$$

where $T=2\pi/\omega_1$, $T_1$ and $V_1$ are order 1 Chebyshev polynomials of type I and type II, respectively, and $J_0$ is the order 0 Bessel function of the first kind [see Section 13.3 of Mathematical Methods for Physicists by G. Arfken (Academic Press-New York) 1968].

The phase offset $\chi_0$ generally need not be determined other than meet the condition that it not be variable during a period of scanning object material 112. To compare results obtained at different times, it may be necessary to determine any change that may have occurred during the period between the two different measurement times. Relative changes in $\chi_0$ can be determined for example by acquiring arrays of amplitudes $[(|S_I|)_n]$ and phases $[(\phi)_n]$ in array $[S_n]$ for object material 112 comprising an isotropic medium, e.g., fused silica, with a surface flat to requisite accuracy.

The first variant of the first embodiment has the advantage of a heterodyne detection system.

The remaining description of the first variant of the first embodiment is the same as corresponding portions of the description given for the first embodiment.

Figure 1B:
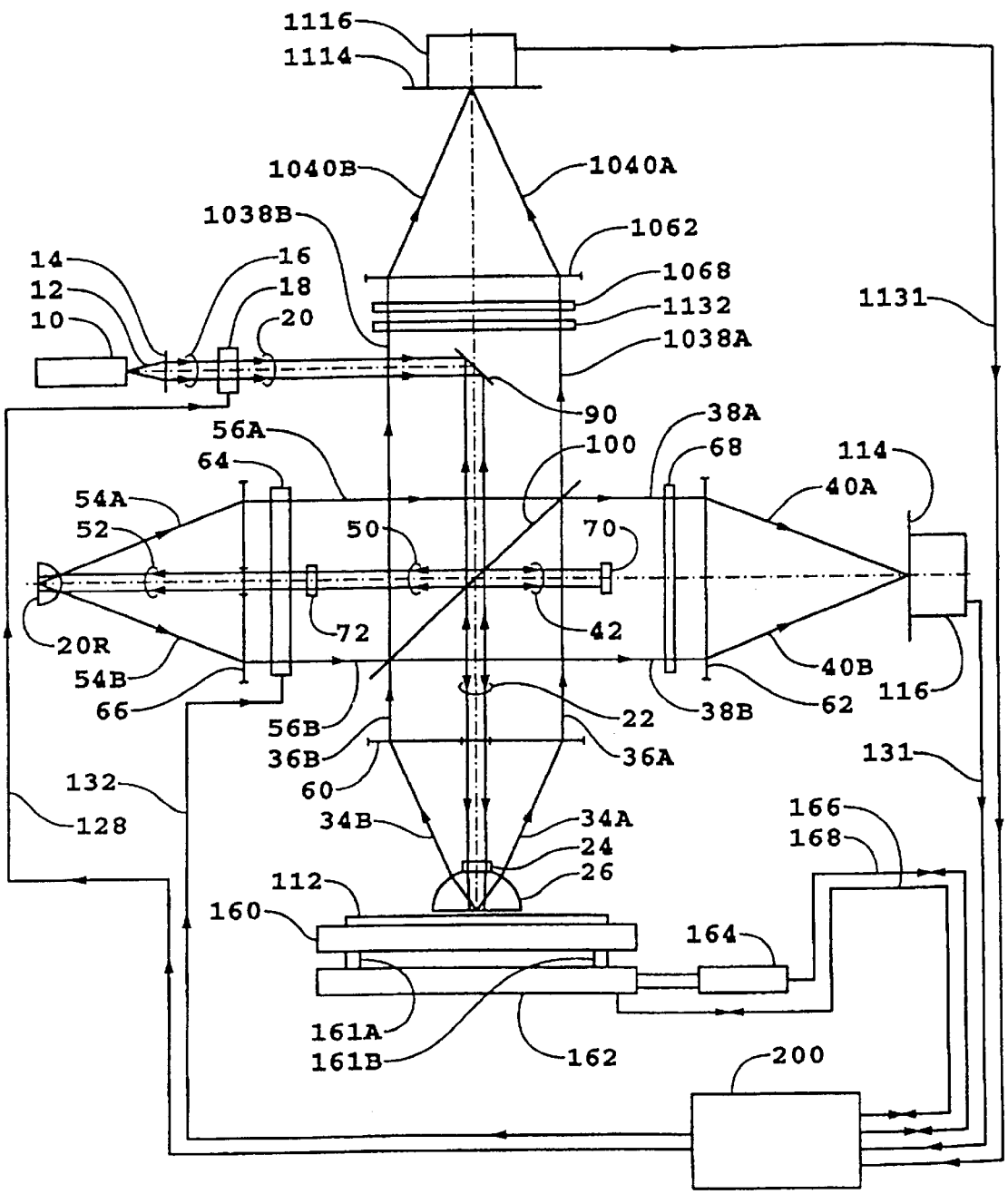
FIG. 1b illustrates, in schematic form, the first variant of the first embodiment of the present invention.

A second variant of the first embodiment of the present invention is shown schematically in FIG. 1b. The difference between the second variant of the first embodiment and the first embodiment is that, in the second variant, two arrays of signal values $[S_n]_m$ and $[S_n]_{m+1}$ are acquired simultaneously with a reduction in time to acquire a given set of arrays of signal values, with improved signal-to-noise ratios, and a reduced sensitivity to vibrations or motion of object material 112. The two arrays of signal values $[S_n]_m$ and $[S_n]_{m+1}$ may correspond to two different states of polarization for a near-field probe beam for the same value of $\chi$ or different values of $\chi$ or may correspond to two different values of $\chi$ for the same states of polarization of an associated near-field probe beam.

Many elements of the second variant of the first embodiment perform similar functions as elements of the first embodiment and are indicated in FIG. 1b with the same element numbers as corresponding elements of the first embodiment shown in FIG. 1a. The second variant of the first embodiment comprises additional elements that also perform similar functions as certain elements of the first embodiment. The element numbers of the additional elements are the same as the element numbers of corresponding certain elements of the first embodiment, incremented by 1000.

Beam 20 is incident on non-polarizing beam splitter 100 after reflection by mirror 90. For the mode of operation wherein the two arrays of signal values $[S_n]_m$ and $[S_n]_{m+1}$ correspond to two different states of polarization for a near-field probe beam, polarizer 1068 is oriented relative to the orientation of polarizer 68, so that mixed beam 1040 comprising rays between rays 1040A and 1040B represents information about a polarization component of beam 36 that is orthogonal to the polarization component of beam 36 represented by information in mixed beam 40. Reference beam 50 is transmitted by half-wave phase retardation plate 72 wherein half-wave phase retardation plate 72 is orientated so that the plane of polarization of beam 52 is orthogonal to the plane of FIG. 1b. Electronic controller, signal processor, and computer 1200 performs the functions of electronic controller, signal processor, and computer 200 of the first embodiment and the corresponding functions for processing the information contained in signal 1131.

That portion of the procedure of the first embodiment wherein the plane of polarization of beam 16 is rotated for acquisition of a second set of four arrays of signal values is not repeated in the second variant of the first embodiment configured for the mode of operation wherein the two arrays of signal values $[S_n]_m$ and $[S_n]_{m+1}$ correspond to two different states of polarization for a near-field probe beam.

For the modes of operation wherein the two arrays of signal values $[S_n]_m$ and $[S_n]_{m+1}$ correspond to two different values of $\chi$ for either two different states of polarization or the same states of polarization of a near-field probe beam, phase retardation plate 1132 is adjusted to introduce a relative phase shift between components of beam 1038 so as to achieve the desired effect of a different value of $\chi$.

An advantage of the second variant of the first embodiment with respect to the first embodiment is the acquisition of two arrays of signal values simultaneously with benefits of reduced time to require a given set of arrays of signal values, improved signal-to-noise ratios, and a reduced sensitivity to vibration or motion of object material 112 during information acquisition.

The remaining description of the second variant of the first embodiment is the same as corresponding portions of the description given for the first embodiment.

Figure 1C:
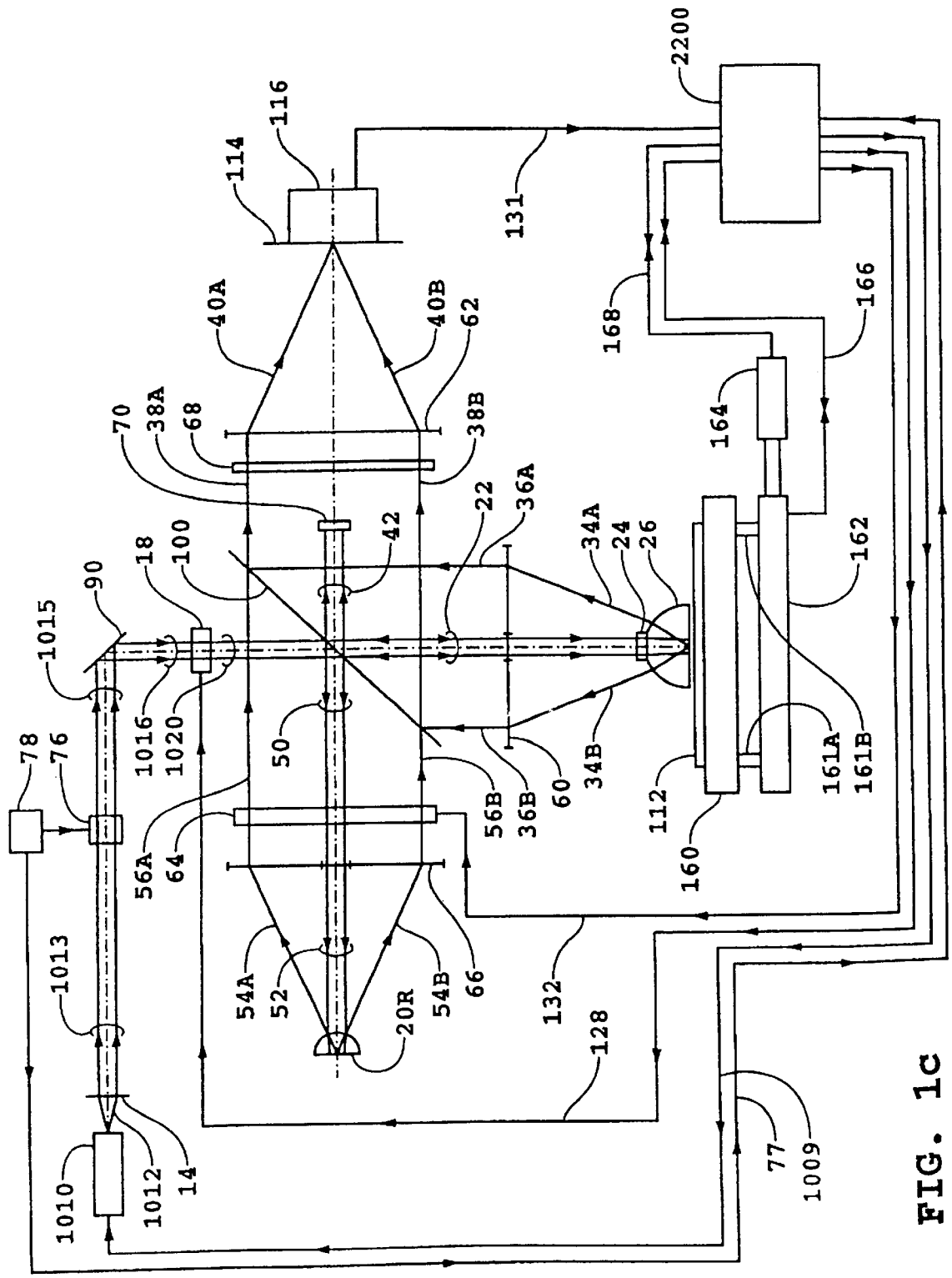
FIG. 1c illustrates, in schematic form, the second variant of the first embodiment of the present invention.

A third variant of the first embodiment of the present invention is shown schematically in FIG. 1c. The third variant of the first embodiment differs from the first embodiment in the mode used for scanning object material 112. The third variant of the first embodiment acquires arrays of signal values $[S_n]_m$ operating in a continuous scanning mode in lieu of the step-and-repeat mode of the first embodiment.

Many elements of the third variant of the first embodiment perform similar functions as elements of the first embodiment and are indicated in FIG. 1c with the same element numbers as corresponding elements of the first embodiment shown in FIG. 1a.

Light source 1010 is a pulsed source. It will be appreciated by those skilled in the art that there are a number of different ways for producing a pulsed source [see Chapter 11 entitled "Lasers", *Handbook of Optics*, 1, 1995 (McGraw-Hill, New York) by W. Silfvast]. There will be a restriction on the duration or "pulse width" of a beam pulse $\tau_{p1}$ produced by source 1010 as a result of the continuous scanning mode used in the third variant of the first embodiment. Pulse width $\tau_{p1}$ will be a parameter that in part controls the limiting value for spatial resolution in the direction of a scan to a lower bound of $$\tau_{p1}v \qquad (8)$$

where v is the scan speed. For example, with a value of $\tau_{p1}=50$ nsec and a scan speed of v=0.20 m/sec, the limiting value of the spatial resolution $\tau_{p1}v$ in the direction of scan will be $$\tau_{p1}v=10 \text{ nm}. \qquad (9)$$

Source 1010 produces an optical beam 1012 that is plane polarized parallel to the plane of FIG. 1c. Beam 1012 is incident on a modulator 76 and exits modulator 76 as beam 1015. Modulator 76 may, for example, be an acousto-optical device or a combination of acousto-optical devices with additional optics for modulating a portion of beam 1012. Modulator 76 is excited by a driver 78 at a frequency $f_2$. Modulator 76 diffracts by an acousto-optical interaction a portion of beam 1012 as a diffracted beam component of beam 1015. The frequency of the diffracted beam component of beam 1015 is frequency shifted by an amount $f_2$ with respect to the non-diffracted, non-frequency shifted component of beam 1015 and is linearly polarized orthogonally with respect to the plane of polarization of the non-diffracted, non-frequency shifted component of beam 1015.

It will also be appreciated by those skilled in the art that the two optical frequencies of beam 1015 may be produced by any of a variety of frequency modulation apparatus: (1) use of a pair of acousto-optical Bragg cells, see for example, Y. Ohtsuka and K. Itoh, "Two-frequency Laser Interferometer for Small Displacement Measurements in a Low Frequency Range," *Applied Optics,* 18(2), pp 219–224 (1979); N. Massie et al., "Measuring Laser Flow Fields With a 64-Channel Heterodyne Interferometer," *Applied Optics,* 22(14), pp 2141–2151 (1983); Y. Ohtsuka and M. Tsubokawa, "Dynamic Two-frequency Interferometry for Small Displacement Measurements," *Optics and Laser Technology,* 16, pp 25–29 (1984); H. Matsumoto, ibid.; P. Dirksen, et al., U.S. Pat. No. 5,485,272, issued Jan. 16, 1996; N. A. Riza and M. M. K. Howlader, "Acousto-optic system for the generation and control of tunable low-frequency signals," *Opt. Eng.,* 35(4), pp 920–925 (1996); (2) use of a single acousto-optic Bragg cell, see for example, G. E. Sommargren, commonly owned U.S. Pat. No. 4,684,828, issued Aug. 4, 1987; G. E. Sommargren, commonly owned U.S. Pat. No. 4,687,958, issued Aug. 18, 1987; P. Dirksen, et al., *ibid.*; or (3) the use of the systems described in U.S. patent application with Ser. No. 09/507,529 filed Feb. 18, 2000 entitled "Apparatus For Generating Linearly Orthogonally Polarized Light Beams" by Henry A. Hill. The contents of U.S. Pat. Application with Ser. No. 09/507,529 are incorporated herein by reference.

Beam splitter 1000 is a polarizing type beam splitter so that the reference beam comprises one frequency component of beam 1020 and measurement beam 22 comprises the second frequency component of beam 1020. The plane of polarization of reference beam 50 is orthogonal to the plane of FIG. 1b.

The description of beam 40 of the third variant of the first embodiment is the same as corresponding portions of the description given for beam 40 of the first embodiment except with respect to being a pulsed beam, except to the diference in frequencies of the reference beam 50 and measurement beam 22, and except with respect to the plane of polarization of reference beam 52 of the third variant of the first embodiment being orthogonal to the plane of polarization of beam 22.

Beam 40 is detected by detector 116, preferably by a quantum photon detector, to generate electrical interference signal 1031 comprising an array of signal values $[S_n]$. Array of signal values $[S_n]$ can be written to a good approximation the form of Eq. (1), wherein $$(S_I)_n = (|S_I|\cos(\omega_2 t + \phi + \chi + \zeta_2))_n \quad (10)$$

$\omega_2 = 2\pi f_2$ and $\zeta_2$ is a phase that is not a function of either $\phi$ or $\chi$ and substantially constant with respect to t.

Electronic controller, signal processor, and computer 2200 determines phase $(\phi+\chi+\zeta_2)$ of $(S_I)_n$ by either digital or analog signal processes, preferably digital processes, using time-based phase detection and the phase of driver 78 which is transmitted to electronic controller, signal processor, and computer 2200 by signal 77. The array of values of $[(\phi)_n]$ is determined from the measured array of phases $[(\phi+\chi+\zeta_2)_n]$ by subtracting array of phases $[(\chi+\zeta_2)_n]$ independently determined if required in an end-use application.

The array of phases $[(\chi+\zeta_2)_n]$ generally need not be determined other than to meet the condition that it not be variable during a period of scanning object material 112. To compare results obtained at different times, it may be necessary to determine any change in the array of phases $[(\chi+\zeta_2)_n]$ that may have occurred during the time between the two different measurement periods. Relative changes in $[(\chi+\zeta_2)_n]$ can be determined for example by acquiring arrays of signal values $[S_n]$ for object material 112 comprising an isotropic medium, e.g., fused silica, with a surface flat to required accuracy. Again these relative changes in $[(\chi+\zeta_2)_n]$ are preferably, and expectedly, designed to be small.

The coherence time $\tau_c$ for a pulse of beam 1015 is taken by way of a non-limiting example to be substantially equal to the pulse width $\tau_{p2}$. For the conditions where arrays of signal values $[S_n]$ are measured by detector 116 as an integral over a time interval $\Delta t$, $\Delta t = \tau_c$, and $\tau_c = 1/f_2$, the description of signal values $[S_n]$ is substantially the same as corresponding portions of the description given of arrays of signal values $[S_n]$ of the first embodiment with $\chi$ of the first embodiment given by $$\chi = \omega_2 t, \text{ modulo } 2\pi. \quad (11)$$

Therefore, the description of the third variant of the first embodiment, when source 1010 is a pulsed source with a pulse coherence time of $\tau_c$, is equivalent to the description of the first embodiment with $\chi$ of the first embodiment replaced by $\omega_2 t$, modulo $2\pi$. The time of the pulses of source 1010 would be selected such $\omega_2 t$ comprise a set of values where each value of the set is an integer multiple of $2\pi$ plus a value from a finite set of values, e.g., 0, $\pi/2$, $\pi$, and $(3/2)\pi$. The timing of the pulses of source 1010 is controlled by signal 1009 generated by electronic controller, signal processor, and computer 2200.

An advantage of the third variant of the first embodiment with respect to the first embodiment is the frequency at which the phase corresponding to $\chi$ of the first embodiment can be changed. The frequency for the change in phase modulo $2\pi$ in the third variant of the first embodiment, a phase equivalent to % in the first embodiment, can be as high as of the order of 5 Mhz and remain consistent with the condition $\tau_c = 1/f_2$.

The timing of pulses from source 1010 is coordinated by electronic controller, signal processor, and computer 2200 so that for a scan speed v and the spacing of elements 30 and 32 of element 28, information equivalent to arrays of signal values $[S_n]_1$, $[S_n]_2$, $[S_n]_3$, and $[S_n]_4$ of the first embodiment is acquired for the third variant of the first embodiment. A normalization is performed by electronic controller, signal processor, and computer 2200 to compensate for a variation in efficiencies in generation and detection of interference cross terms between complex amplitudes of the near-field return probe beam or the amplitudes of the second background return beam and the reflected reference beam from one element to a second element of an array of signal values. Information required for the normalization can be determined for example by acquiring arrays of signal values $[S_n]$ for object material 112 comprising an isotropic medium, e.g., fused silica, with a surface flat to required accuracy.

It will be evident to those skilled in the art that source 1010 of the third variant of the first embodiment may be replaced with a CW source and the phases of arrays of signal values $[S_n]$ determined using known heterodyne detection techniques or phase-sensitive detection techniques for non-pulsed signals. The heterodyne detection techniques or phase-sensitive detection techniques may include analog phase-sensitive detection or digital techniques such as a digital Hilbert transform phase detector [see "Phase-locked loops: theory, design, and applications" 2nd ed. (McGraw-Hill, New York) 1993, by R. E. Best], a phase-locked loop [see R. E. Best, ibid.], a sliding window FFT [see *Digital Techniques for Wideband Receivers*, (Artech House, Boston) 1995, by J. Tsui], without departing from either the scope or spirit of the present invention.

It will also be evident to those skilled in the art that the third variant of the first embodiment can be modified so as to obtain two or more simultaneous measurements of arrays of signal values $[S_n]$ according to the teachings of the second variant of the first embodiment, without departing from the spirit and scope of the present invention.

Phase shifter 64 may be used in the third embodiment to confirm that the values of phase shifts produced by the combination of the timing of the pulses from source 1010 and modulator 76 are equivalent to a desired set of phase shifts.

The remaining description of the third variant of the first embodiment is the same as corresponding portions of the description given for the first embodiment.

Figure 1D:
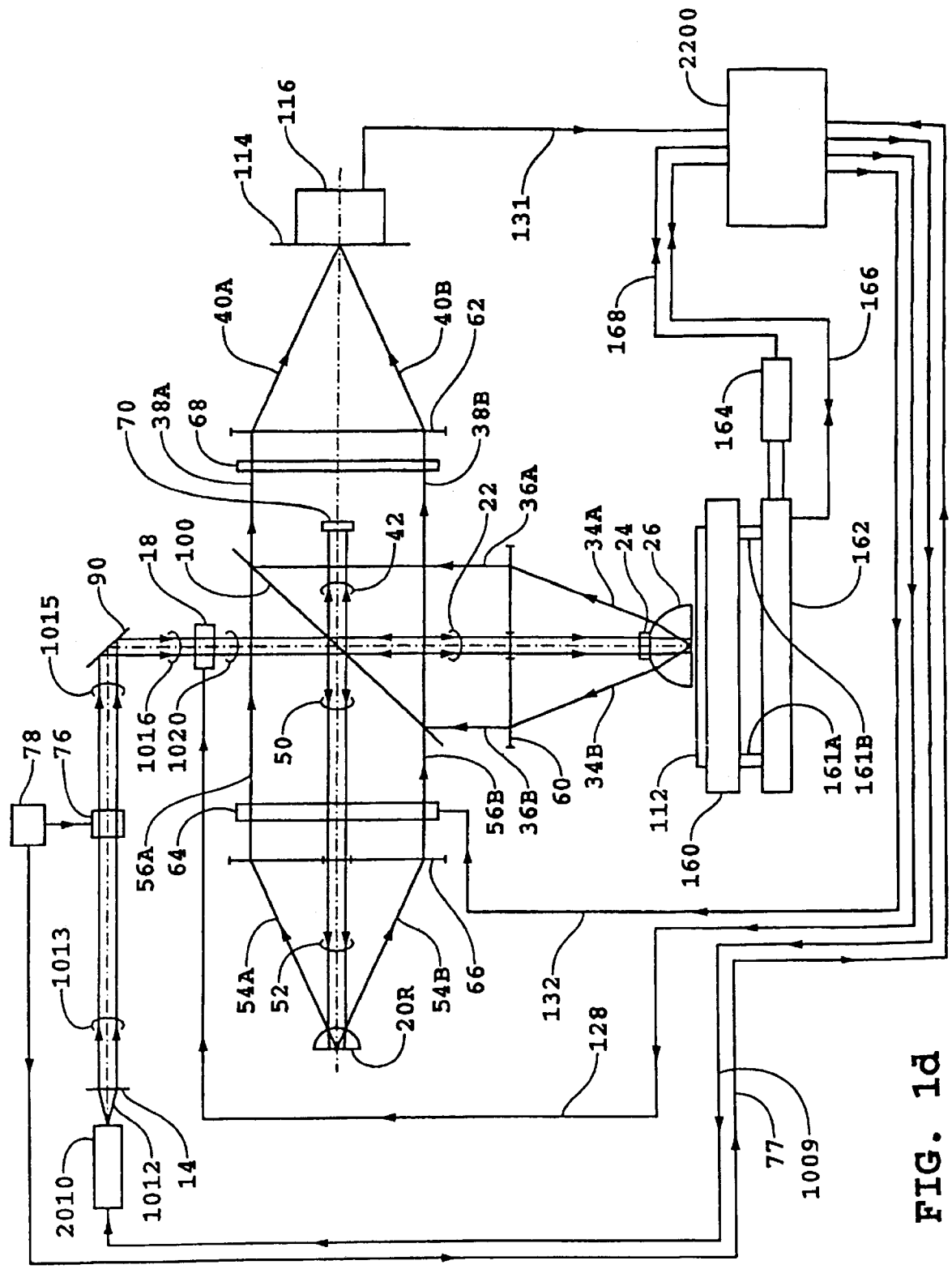
FIG. 1d illustrates, in schematic form, the third variant of the first embodiment of the present invention.

A fourth variant of the first embodiment of the present invention is shown schematically in FIG. 1d. The fourth variant of the first embodiment differs from the third variant of the first embodiment in the use of two different wavelength components for an input beam. The fourth variant of the first embodiment acquires simultaneously two arrays of signal values $[S_n]_m$ corresponding the two different wavelength components of the input beam in lieu of the acquisition of arrays of signal values $[S_n]_m$ corresponding to a single wavelength of input beam 1016 in the third variant of the first embodiment.

Many elements of the fourth variant of the first embodiment perform similar functions as elements of the third variant of the first embodiment and are indicated in FIG. 1d with the same element numbers as corresponding elements of the third variant of the first embodiment shown in FIG. 1c.

Light source 2010 comprises two pulsed sources operating at two different wavelengths. The pulsed beams are combined by a dichroic beam splitter (not shown in FIG. 1d) as beam 1012. The description of beam 1012 of the fourth variant of the first embodiment is the same as corresponding portions of the description given for beam 1013 of the third variant of the first embodiment except with respect to being a pulsed beam with two different wavelength components. Timing of pulses from the two different wavelength sources is controlled by signal 128 from electronic controller, signal processor, and computer 2200.

The description of beam 40 of the fourth variant of the first embodiment is the same as corresponding portions of the description given for beam 40 of the third variant of the first embodiment except with respect to being a pulsed beam with two different wavelength components.

The remaining description of the fourth variant of the first embodiment is the same as corresponding portions of the description given for the third variant of the first embodiment.

An advantage of the fourth variant of the first embodiment is the simultaneous acquisition of two arrays of signal values $[S_n]_m$ corresponding the two different wavelengths.

Additional reflection and/or scattering properties of different near-field probe beams by object material 112 may be required for determination of specific properties of object material 112 when object material 112 comprises structures having dimensions of the order of the wavelength $\lambda$ and smaller and of differing composition, e.g. silicon, silicon nitride, titanium nitride, aluminum, copper, silicon dioxide, and other semiconducting, conducting, and insulating materials. The structures may be imbedded below the surface and/or located on the surface of object material 112 adjacent to conducting element 28. The structures may further comprise thin film magneto-optical materials such as amorphous rare earth transition metal alloys for magneto-optical storage of data. The dimensions of the structures may be of the order of the wavelength $\lambda$ and smaller in one or two directions parallel to the surface of object material 112 and/or in the a direction orthogonal to the surface of object material 112. The structures may further comprise complex indices of refraction that are different for one component structure in comparison to another component structure.

Certain of the additional reflection and/or scattering properties of object material 112 are obtained by a second and third embodiments of the present invention wherein near-field probe beams are used that are different from the near-field probe beams used in the first embodiment. The second and third embodiments are depicted schematically in FIGS. 2 and 3, respectively. Many elements of the second and third embodiments shown in FIGS. 2 and 3, respectively, perform the similar functions as like numbered elements of the first embodiment shown in FIG. 1a.

The primary difference between the second and third embodiments and the first embodiment and variants thereof is the angle of incidence of measurement beam 22 at the surface of conducting layer 28. For the first embodiment and variants thereof, the angle of incidence is substantially normal to the surface of conducting layer 28. For the second and third embodiments, the corresponding angle of incidence is of the order of one radian as shown in FIGS. 2 and 3.

Figure 2:
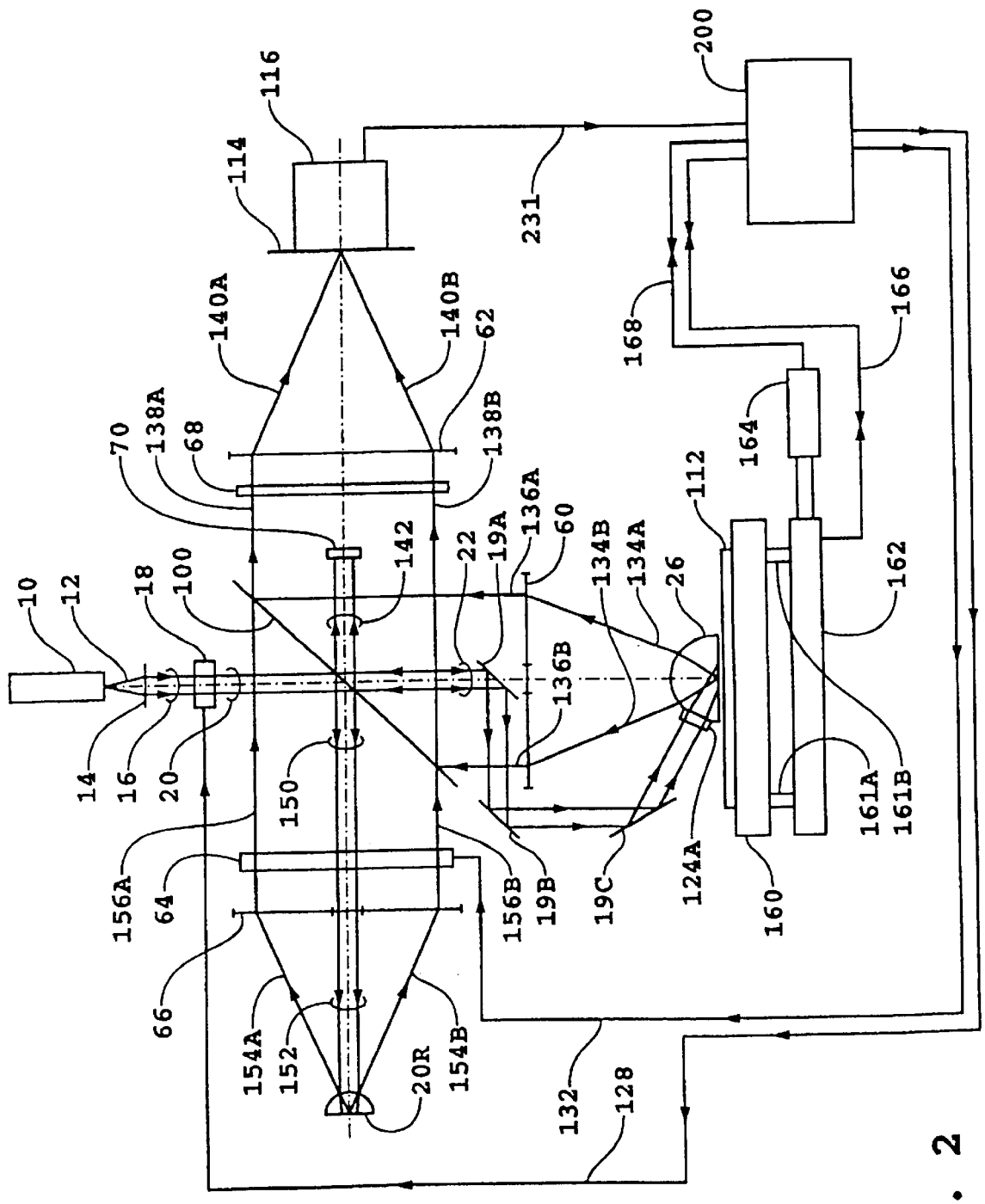
FIG. 2 illustrates, in schematic form, the second embodiment of the present invention.
Figure 3:
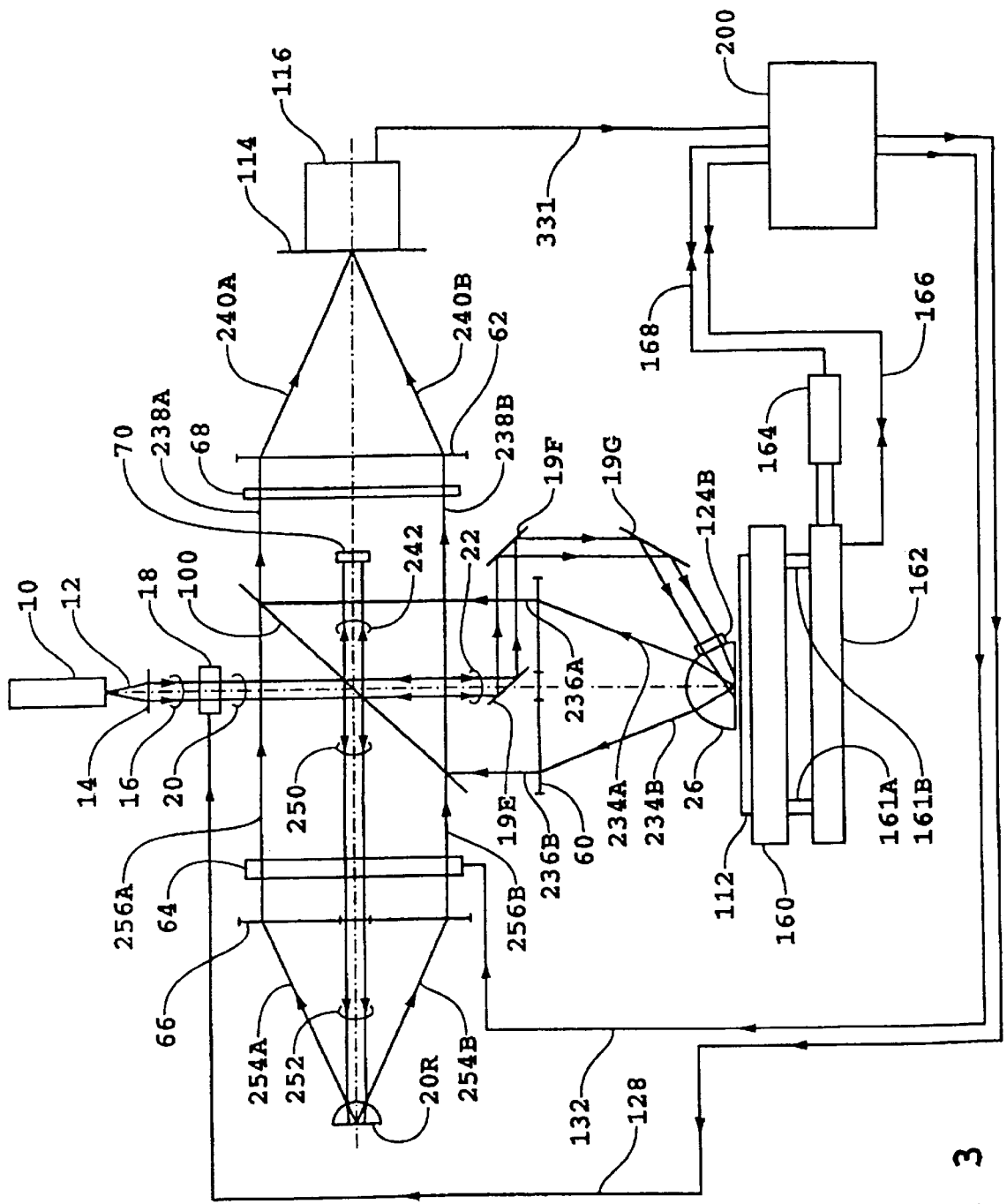
FIG. 3 illustrates, in schematic form, the third embodiment of the present invention.

Measurement beam 22 of the second embodiment as shown in FIG. 2 is reflected sequentially by mirrors 19A, 19B, and 19C and is then incident on a lens assembly comprising lenses 124 and 126. Phase retardation plate 18 is controlled by signal 128 which is generated by electronic controller, signal processor, and computer 200 such the state of polarization of measurement beam 22 is parallel to the plane of FIG. 2. The relationship of lenses 124 and 26 is shown in FIG. 4a. Measurement beam 22 of the second embodiment is focused by the lens assembly to a beam spot on element 28 with an angle of incidence of the order of one radian that encompasses the array of sub-wavelength apertures and sub-wavelength scattering sites in element 28.

A first portion of the measurement beam incident on sub-wavelength apertures 30 is transmitted as a modified near-field probe beam. The primary difference between the modified near field probe beam of the second embodiment and the near-field probe beam of the first embodiment is a difference in near-field multipole composition. The near-field multipole composition of a near-field probe beam of the first embodiment comprises a significant near-field term associated with a magnetic dipole located at a corresponding aperture of apertures 30.

The near-field multipole composition of a near-field probe beam of the second embodiment comprises significant near-field terms associated with both magnetic dipoles and an electric dipole located at a corresponding aperture of apertures 30 [see J. D. Jackson, *Classical Electrodynamics*, Chapter 9, $2^{nd}$ Ed. (Wiley-New York) (1975); "Diffraction Theory," C. J. Bouwkamp, *Reports on Progress in Physics*, 17, pp. 35–100, ed. A. C. Strickland, The Physical Society (1954)]. Because of differences in spatial properties of near-fields associated with a magnetic dipole and spatial properties of near-fields associated with an electric dipole (see FIG. 4b for distributions of certain components of electric fields associated with magnetic dipole aligned to the plane of conducting element 28 and electric dipole orientated orthogonal to the plane of conducting element 28), the complex amplitude of the near-field return probe beam measured by the second embodiment is different from the complex amplitude of the near-field return probe beam measured by the first embodiment. As a consequence, the complex amplitude of the near-field return probe beam measured by the second embodiment represents an "image" of a three dimensional volume section of object material 112 that is different from a corresponding image of object material 112 represented by the complex amplitude of the near-field return probe beam measured by the first embodiment.

The description of return beam 134 and its subsequent treatment by the second embodiment is the same as the corresponding portion of the description given for return beam 34 and its subsequent treatment of the first embodiment. Also, the description of reference beam 150 and its subsequent treatment by the second embodiment is the same as the corresponding portion of the description given for reference beam 34 and its subsequent treatment of the first embodiment.

The remaining description of the second embodiment is the same as corresponding portions of the description given for the first embodiment.

The description of the third embodiment is the same as corresponding portions of the second embodiment, except respect to the direction of corresponding measurement beams incident on conducting element 28. It has been noted that the angle of incidence for measurement beam 22 for the second and third embodiments are of the same size. As shown in FIG. 3, however, the measurement beam of the third embodiment is incident on conducting element 28 from the right side of FIG. 3, whereas the measurement beam of the second embodiment is incident on conduction element 28 from the left side of FIG. 2. As a consequence of cited differences in directions of propagation of respective measurement beams at conducting element 28 for the second and third embodiments, a relative phase of a magnetic dipole and an electric dipole located at a corresponding aperture of apertures 30 is different for the second and third embodiments.

As a result of the difference in relative phase of an magnetic dipole and an electric dipole located at a corresponding aperture of apertures 30 between the second and third embodiments, the complex amplitude of the near-field return probe beam measured by the third embodiment represents an another "image" of a three dimensional volume section of object material 112 different from a corresponding image of object material 112 represented by the complex amplitude of the near-field return probe beam measured by either the first or second embodiments.

The remaining description of the third embodiment is the same as corresponding portions of the description given for the second embodiment.

The lateral resolution of the first embodiment of the present invention is of the order of h. An improved lateral resolution can be obtained in the present invention for example by subtracting measured complex amplitudes of a reflected/scattered probe beam where the near-field probe beam is substantially characterized by an electric dipole from measured complex amplitudes of a reflected/scattered probe beam where the near-field probe beam is substantially characterized by a magnetic dipole. This will be evident to those skilled in the art on consideration of associated field distributions of electric and magnetic dipole field distributions such as shown in FIG. 4b.

The electric fields generated by any multipole source located at sub-wavelength apertures 30 and associated with the near field probe beams for the first, second, third, and fourth embodiments and variants thereof generally have restricted ranges in directions at a specific location in object material 112. This feature of the present invention generally leads to a simpler inverse calculation for properties of the object material 112 from the measured arrays of signal values $[S_n]_1, [S_n]_2, [S_n]_3,$ and $[S_n]_4$ and, if required by an end use application, measured arrays of intensity values $[S_n]_3 - [S_n]_4 = [(S_I)_n]_3 - [(S_I)_n]_4$ as compared to the inverse calculation encountered in profilers, interferometric or otherwise, which rely a spatial resolution defined by imaging with a traditional optical system.

The inverse calculation is simpler in the presently described embodiments because the directions of propagation of components of a near-field probe beam at a given volume section of an object being profiled/imaged are substantially the same for a given measured amplitude and phase of a reflected/scattered near-field probe beam from the volume section, wherein the dimensions of the volume section are much less than the dimensions of the source of the near-field probe beam. The inversion type of calculation is further simplified in the presently described embodiments because the directions of propagation of components of a reflected/scattered near-field probe beam from a given volume section of an object being profiled/imaged are substantially the same for a given measured amplitude and phase of a reflected/scattered near-field probe beam from the volume section. The inversion type of calculation is also further simplified in the presently described embodiments because the directions of propagation of components of a near-field probe beam at a given volume section of an object being profiled/imaged and the directions of propagation of components of a resulting reflected/scattered near-field probe beam from the volume section of the object being profiled/imaged are substantially in opposite directions for a given measured amplitude and phase of a reflected/scattered near-field probe beam from the volume section.

It will be evident to those skilled in the art that the second and third embodiments can be modified so as to obtain two or more simultaneous measurements of arrays of signal values $[S_n]$ and/or utilize a continuous scanning mode with a pulsed source or pulsed sources of different wavelengths according to the teachings of the second, third, and fourth variants of the first embodiment without departing from the spirit and scope of the present invention.

The complex index of refraction of components the object material may be temperature sensitive, e.g., the conductivity of a conducting material or the magnetization of a material. It will be evident to those skilled in the art that first embodiment and variants thereof and the second and third embodiments configured to monitor and/or determine the indices of refraction of components of object material 112 can be used to monitor and/or determine changes in temperature of a subsection of object material 112 without departing from the spirit and scope of the present invention.

Certain other additional reflection and/or scattering properties of object material 112 are obtained by a fourth embodiment of the present invention, wherein an object material under examination comprises an array of sub-wavelength magneto-optical domains or structures of a magneto-optical material. The fourth embodiment further comprises an imaging and detection system for a return beam reflected/scattered by the object material, wherein the reflected beam corresponding to return beam 34 of the first embodiment is different from the imaging and detection system of return beam 34. An example of a magneto-optical material is an amorphous rare-earth transition-metal alloy. The fourth embodiment of the present invention is depicted schematically in FIGS. 6a–6c. Many elements of the fourth embodiment shown in FIG. 6a perform the similar functions as like numbered elements of the first embodiment shown in FIG. 1a.

The plane of polarization of optical beams generally suffer a small Kerr or Faraday rotation in a reflection and/or scattering process at a magneto-optical domain. The imaging and detection system for the return beam 334 of the fourth embodiment is designed to measure an effect of this small rotation of the plane of polarization of a near-field return beam component of beam 334 reflected and/or scattered by a magneto-optical domain in magneto-optical disk 412. Return beam 334 of the fourth embodiment is shown as rays 334A and 334B in FIG. 6a, wherein return beam 334 comprises rays between rays 334A and 334B.

Figure 6A:
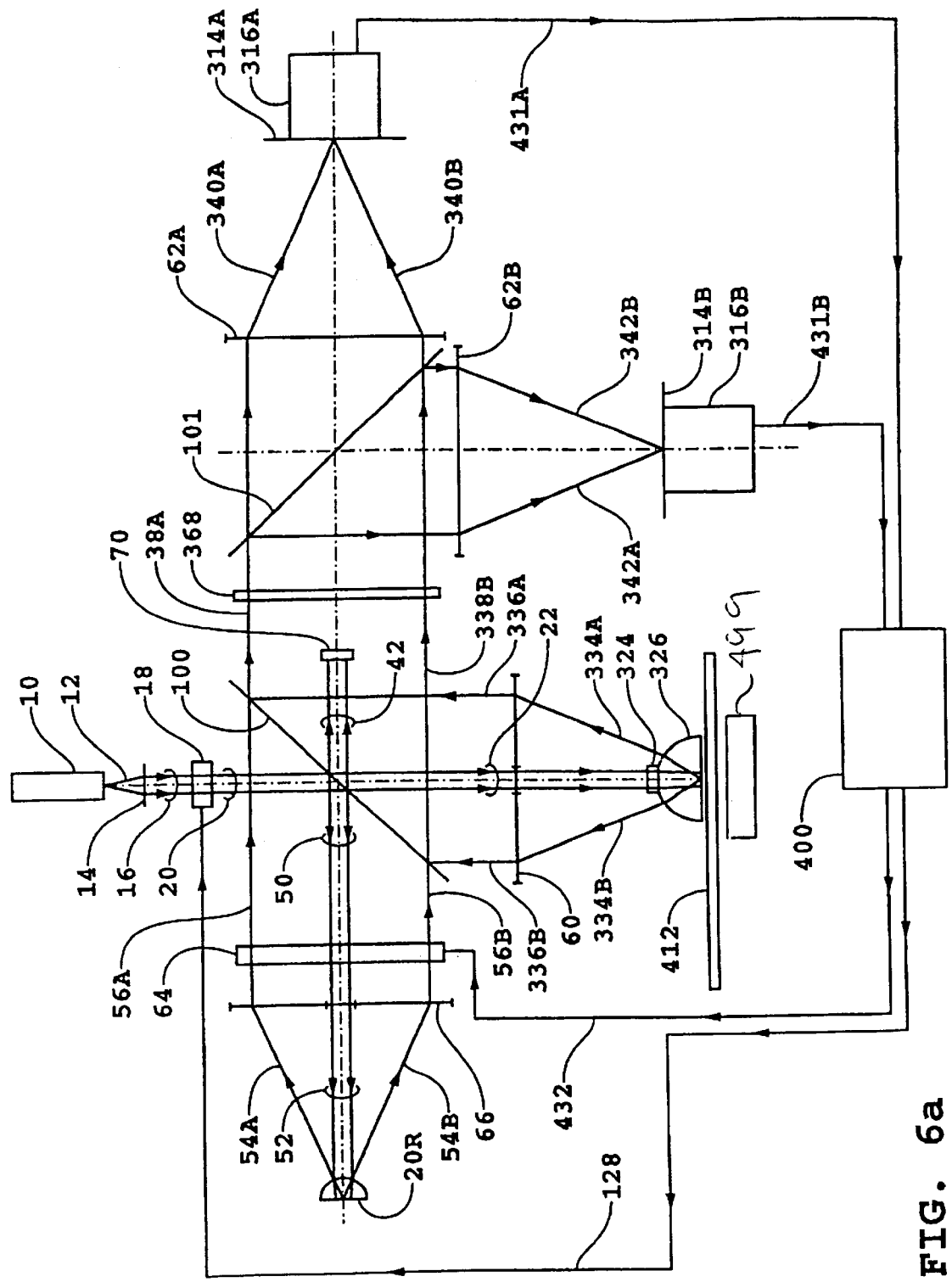
FIG. 6a illustrates, in schematic form, the fourth embodiment of the present invention.
Figure 6B:
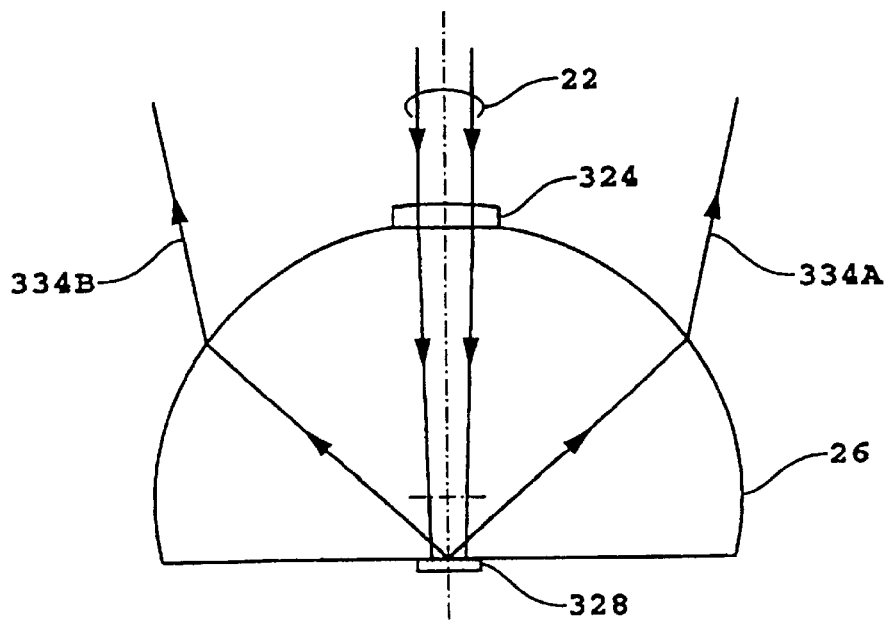
FIG. 6b illustrates, in schematic form, the lens assembly of the fourth embodiment comprising Amici type objective lens 326 and lens 324.
Figure 6C:
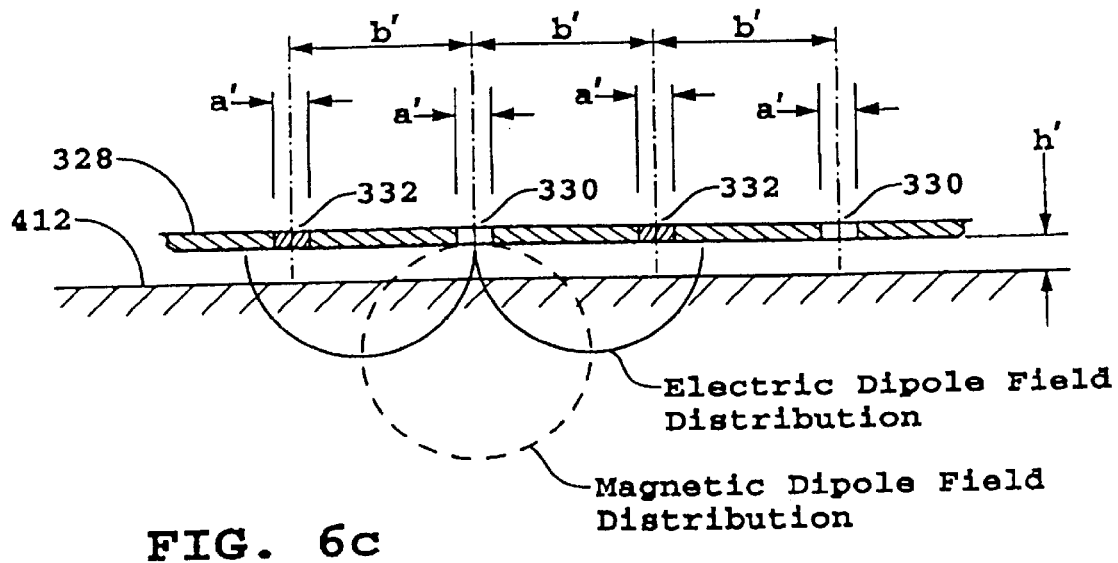
FIG. 6c illustrates for the fourth embodiment, in schematic form, conducting element 328 in relation to object material 412 being profiled/imaged and angular distribution functions of electric far field components associated with an electric dipole and a magnetic dipole located at a sub-wavelength aperture 330.

The description of lens 324 and Amichi type objective 326 shown in FIG. 6b is the same as the description given for lenses 24 and 26 of the first embodiment. A conducting element 328 is attached to lens 326 (see FIG. 6b) and is the same as conducting element 28 attached to Amichi type objective lens 26. Conducting element 328 comprises sub-wavelength apertures 330, the description of which is the same as the corresponding portion of the description given for sub-wavelength apertures 30 of the first embodiment. The diameter and spacing of sub-wavelength apertures 330 are a' and b', respectively, and the separation of adjacent surfaces of conducting element 328 and object material 412 is h' as shown in FIG. 6c. The description of a', b', and h' is the same as the corresponding description given for a, b, and h of the first embodiment.

The lateral location and height of lens 326 relative to magneto-optical disk 412 are maintained by a servosystem (not shown). Preferably the height h' is maintained at a height of approximately 2a' above the magneto-optical disk by an airbearing (a floating Amici type objective lens).

It will be apparent to those skilled in the art that a solid immersion lens as described by T. R. Corle and G. S. Kino in U.S. Pat. No. 5,125,750 entitled "Optical Recording System Employing A Solid Immersion Lens," issued June 1992, may be used between an objective of the interferometer system of the fourth embodiment and the magneto-optical disk without departing from the spirit and scope of the invention.

The description of the propagation of beams 334 and 50 through apparatus of the fourth embodiment to form beam 338 is the same as the corresponding portion of the description given for the propagation of beams 34 and 50 through the apparatus of the first embodiment to form beam 38. Beam 338 is shown as rays 338A and 338B in FIG. 6a wherein beam 338 comprises rays between rays 338A and 338B.

Element 368 depicted in FIG. 6a comprises a half wave phase retardation plate. The orientation of the half wave phase retardation plate is oriented to rotate the plane of polarization of a return probe beam component of beam 338 so as to maximize a sensitivity of detected signals, subsequently described, to effects of a change in a magnetic state of the magnetic-domains in magneto-optical disk 412.

Beam 338 is transmitted by half wave phase retardation plate 368 and a first portion thereof is transmitted by polarizing beam splitter 101 and then focused as a mixed beam (with respect to polarization) by lens 62A as beam 340. Beam 340 is shown as rays 340A and 340B in FIG. 6a, wherein beam 340 comprises rays between rays 340A and 340B. Mixed beam 340 is focused onto a pinhole plane 314A such that a pinhole in image plane 314A is a conjugate image of a sub-wavelength aperture 330 in conducting element 328. A second portion of beam 338 transmitted by half wave phase retardation plate 368 is reflected by polarizing beam splitter 101 and then focused as a mixed beam (with respect to polarization) by lens 62B as beam 342. Beam 342 is shown as rays 342A and 342B in FIG. 6a, wherein beam 342 comprises rays between rays 342A and 342B. Mixed beam 342 is focused onto a pinhole in image plane 314B, such that the pinhole in image plane 314B and the pinhole in image plane 314A are conjugate images of the same sub-wavelength aperture 330 in conductor 328.

The description of image planes 314A and 314B, detectors 316A and 316B, respectively, and signals 431A and 431B, respectively, is the same as the corresponding portion of the description given for image plane 114, detector 116, and signal 131 of the first embodiment.

Operation of apparatus of the fourth embodiment of the present invention depicted in FIG. 6a is based on acquisition of a sequence of corresponding arrays of signal values $[S_n]_9$ and $[S_n]_{10}$ by detectors 316A and 316B, respectively. The two corresponding arrays of signal values $[S_n]_9$ and $[S_n]_{10}$ are sent to electronic controller, signal processor, and computer 400 as signals 431A and 431B, respectively, in either digital or analog format, preferably in digital format, for subsequent processing.

Subsequent description of the fourth embodiment will be in terms of optical data storage and recovery based on the polar magneto-optical Kerr effect as a non-limiting example without departing from the spirit or scope of the present invention.

When linearly polarized light is normally incident on a perpendicularly magnetized medium, the reflected state of polarization by way of the polar magneto-optical Kerr effect has a small rotation and a certain degree of ellipticity. One may consider the reflected polarization as consisting of two linear components: $E_\parallel$ which is parallel to the direction of incident polarization, and $E_\perp$ which is perpendicular to it. The phase difference between $E_\parallel$ and $E_\perp$ is somewhere between 0° and 90° resulting in a reflected beam which has some degree of ellipticity $\epsilon_k$ with the major axis of the polarization ellipse rotated by an angle $\theta_k$ (relative to the incident plane of polarization).

The optimum sensitivity to effects of magneto-optical domains of object material 412 is obtained by selecting a particular setting for the orientation of half wave phase retardation plate 368 and selecting a particular phase shift $\chi$ introduced by phase shifter 64. The particular setting for the orientation of half wave phase retardation plate 368 is the one for which the plane of polarization of the return probe beam component $E_\parallel$ of beam 338 is at an angle of 45° to the plane of incidence at polarizing beam splitter 101. The particular phase shift $\chi$ is the one for which reference beam component $E_R$ and the return probe beam component $E_\perp$ of beam 338 are either in phase or out of phase by 180°. Then, corresponding arrays of signal values $[S_n]_9$ and $[S_n]_{10}$ can be expressed as $$[S_n]_9=[(\eta|\vec{E}_R+\vec{E}_\parallel+\vec{E}_\perp|^2)_n]_9, [S_n]_{10}=[(\eta|\vec{E}_R+\vec{E}_\parallel-\vec{E}_\perp|^2)_n]_{10} \quad (12)$$

where $(\eta)_n$ is an array of constants of proportionalities. The effect of the polar magneto-optical Kerr effect is then detected as the difference of corresponding arrays of signal values $[S_n]_9$ and $[S_n]_{10}$ according to the equation $$\left(\frac{E_\perp}{E_R}\right)_n = \left[\frac{1}{2}\frac{((S_n/\eta_n)_9 - (S_n/\eta_n)_{10})}{((S_n/\eta_n)_9 + (S_n/\eta_n)_{10})}\left[\frac{1}{+2(\cos\phi)_n(E_\parallel/E_R)_n}\right]\right] \quad (13)$$

where $(\phi)_n$ is the phase angle between $(E_\parallel)_n$ and $(E_\perp)_n$. The value of $(E_R)_n$ relative to the value of a background return beam is preferably chosen to maximize the signal-to-noise ratio for the measured quantity $(E_\perp/E_R)_n$, as described in a subsequent section entitled "Statistical Error."

Information is written to optical storage element 412 by a thermomagnetic process. An electromagnet 499 is placed near optical disk 412 and one or more of the pinholes in pinhole plane 314A are replaced by laser sources (i.e., write beam sources) whose intensities and/or phases are controlled by a controller and computer system. The field of the electromagnet field helps orient the direction of magnetization in the areas heated by the near-field probe beams generated by images of the laser sources located at pinholes in pinhole plane 314A, and their interference with the near-field probe beams derived from the measurement beam (which for writing applications define reference beams). The laser sources (write beam sources) can be produced by an array of independently controlled lasers, or by a single laser operating in conjunction with a spatial light modulator to produce the independently controlled laser sources. The system can include a movable stage (not shown) for adjustably switching the detector array with the write beam laser sources. Thus, the movable stage permits the system to switch from a reading operation to a writing operation.

It will be evident to those skilled in the art that the fourth embodiment can be modified so as to obtain three or more simultaneous measurements of arrays of signal values $[S_n]$ and/or utilize a continuous scanning mode with a pulsed source or sources operating at two or more wavelengths according to the teachings of the second, third, and fourth variants of the first embodiment and the second and third embodiments without departing from the spirit and scope of the present invention.

It will be apparent to those skilled in the art that information acquired about object material 112 and optical storage element 412 is substantially insensitive to vibrations when using the present invention with arrays of sub-wavelength apertures because such vibrations substantially uniformly affect mask/sample spacing across the aperture array.

Notably, because the presently described embodiment measures a polarization rotation of the near-field signal beam corresponding to the binary magneto-optic state of a particular domain of the optical storage element 412, the first background return beam described in the previous embodiments need not be compensated for in the interference signals. This is generally the case when the optical storage element stores binary information. In other optical storage embodiments, the compensation schemes described in the previous embodiments, e.g., those that employ scattering sites on the near-field mask and the reference object, can be used to compensate for the contribution of the first background return beam to the interference signals. The latter compensation would be especially useful where each domain in the optical storage medium stores analog information or is in one more than two states.

More generally, the optical storage system described above can be used to read and/or write information from and/or to optical storage media different from a magneto-optic medium, e.g., a photorefractive medium or other media in which information is written as a change in complex refractive index.

Figure 9:
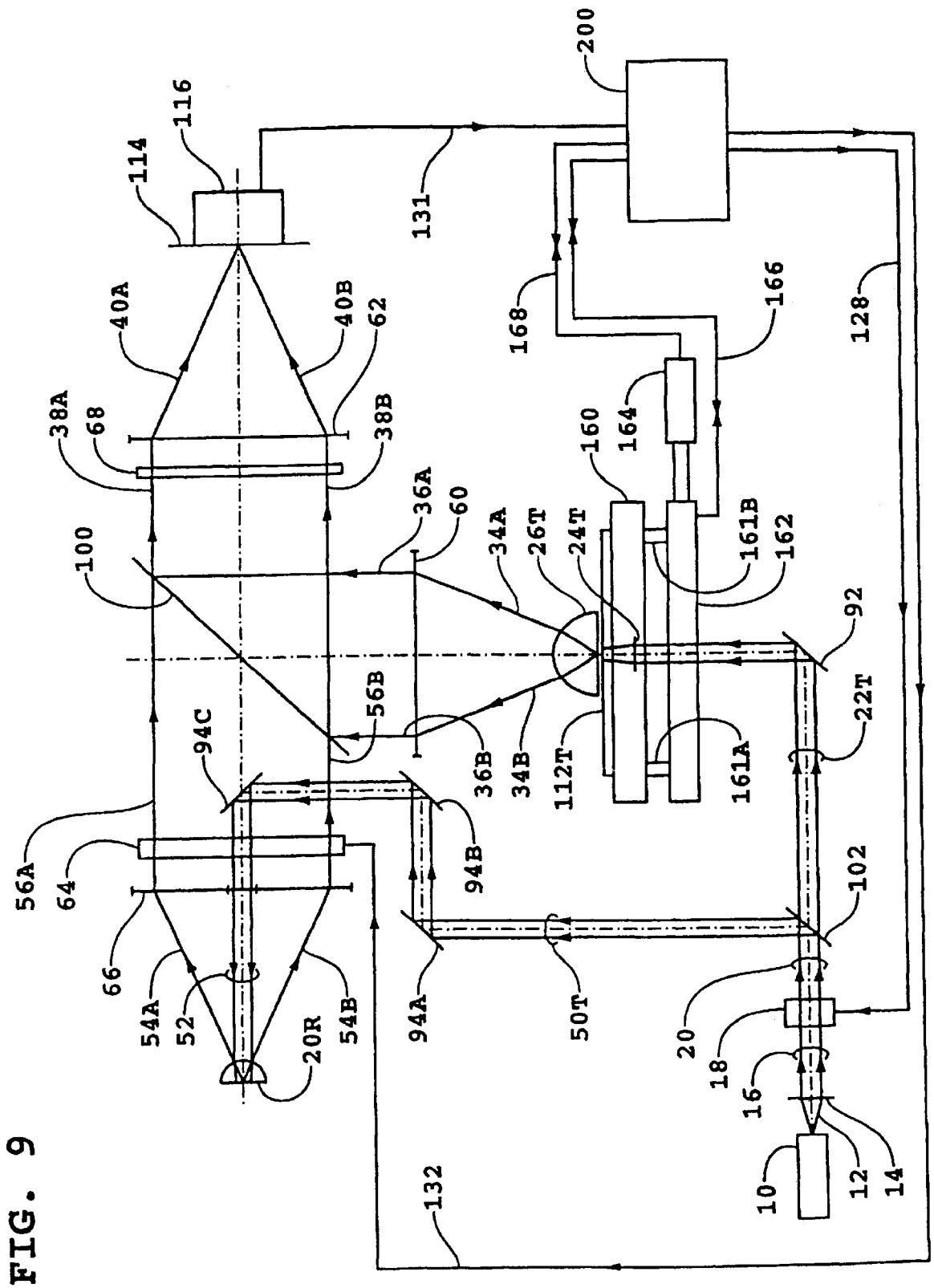
FIG. 9 illustrates, in schematic form, the fifth embodiment of the present invention.

Any of the embodiments described above can also be implements in a transmission mode. A fifth embodiment shown schematically in FIG. 9 is an example of such an embodiment. The fifth embodiment is a scanning interferometric near-field microscope operating in a transmission mode.

Many elements of the fifth embodiment perform similar functions as elements of the first embodiment and are indicated in FIG. 9 with the same element numbers as corresponding elements of the first embodiment shown in FIG. 1a.

Beam 20 is incident on non-polarizing beam splitter 102, and a first portion thereof is transmitted as measurement beam 22T. Measurement beam 22T is next reflected by mirror 92 and then focused to a spot on substrate 112T after reflection by mirror 90. Substrate 112T comprises a transparent substrate at the wavelength of beam 20 and an array of wavelength and/or sub-wavelength apertures corresponding to apertures 30 of the first embodiment. A portion of measurement beam 22T focused to the spot is transmitted by the sub-wavelength apertures 30 as an array of near-field probe beams. The description of the sub-wavelength apertures 30 is the same as the corresponding portion of the description given for the array of sub-wavelength apertures 30 of the first embodiment. The diameter of the spot is large enough span the array of sub-wavelength apertures 30.

Sample 25 to be examined by the array of near-field beams is placed on the flat surface of Amici type lens 26T. The array of near-field probe beams is transmitted by sample 25 as a transmitted beam 34 corresponding to beam 34 of the first embodiment with respect to subsequent processing by the apparatus of the fifth embodiment.

A second portion of beam 20 is reflected by mirror 102 as reference beam 50T, as shown in FIG. 9. Reference beam 50T is transmitted through an aperture in lens 60 as reference beam 52 after reflection by mirrors 94A, 94B, and 94C. The description of reference beam 52 is the same as corresponding portions of the description given for beam 52 of the first embodiment.

The remaining description of the fifth embodiment is the same as corresponding portions of the descriptions given for the first embodiment and variants thereof and the second, third, and fourth embodiments of the present invention.

Statistical Error

Consider the response of the apparatus of the present invention to an object material 112 of the first embodiment and variants thereof and of the second, third, and fifth embodiments and optical storage element 412 of the fourth embodiment. The following description will be in terms of object material 112 without departing from the spirit and scope of the invention. The output signal $(S_n)$ corresponding to a certain pixel of detector 116 and a corresponding sub-wavelength aperture element 30 and with a certain location of object material 112 relative to conducting plane 28 is of the form $$S_n(\chi) \propto \iint\int_n |U_R|^2 dxdydt + \iint\int_n |U_B|^2 dxdydt + \quad (14)$$

$$\iint\int_n |U_S|^2 dxdydt +$$

$$\cos\chi \iint\int_n \begin{pmatrix} U_R U_S^* + \\ U_R^* U_S \end{pmatrix} dxdydt +$$

$$j\sin\chi \iint\int_n \begin{pmatrix} U_R U_S^* - \\ U_R^* U_S \end{pmatrix} dxdydt +$$

$$\cos\chi \iint\int_n \begin{pmatrix} U_R U_B^* + \\ U_R^* U_B \end{pmatrix} dxdydt +$$

$$j\sin\chi \iint\int_n \begin{pmatrix} U_R U_B^* - \\ U_R^* U_B \end{pmatrix} dxdydt +$$

$$\iint\int_n (U_S U_B^* + U_S^* U_B) dxdydt$$

where the integration $$\iint\int_n$$

is over the area of the corresponding detector pinhole at plane 114 and for a time interval $\Delta t$, $U_R$, $U_B$, and $U_S$ are the complex amplitudes of the reflected reference beam, of the first background return beam, and the near-field return probe beam, respectively, $j^2 = -1$, and $\chi$ is the phase shift introduced by phase shifter 64. The corresponding equations for elements of the arrays of signal differences $[\Delta S_n]_1 = [S_n]_1 - [S_n]_2$ and $[\Delta S_n]_2 = [S_n]_3 - [S_n]_4$ can be expressed as $$(\Delta S_n)_1 \propto 2\iint\int_n (U_R U_B^* + U_R^* U_B) dxdydt + \quad (15)$$

$$2\iint\int_n (U_R U_S^* + U_R^* U_S) dxdydt$$

$$(\Delta S_n)_2 \propto j2\iint\int_n (U_R U_B^* - U_R^* U_B) dxdydt + \quad (16)$$

$$j2\iint\int_n (U_R U_S^* - U_R^* U_S) dxdydt.$$

The statistical errors for $$\iint\int_n (U_R U_S^* + U_R^* U_S) dxdydt \text{ and } j\iint\int_n (U_R U_S^* - U_R^* U_S) dxdydt$$

can be expressed as $$\frac{\sigma^2\left[\iint\int_n (U_R U_S^* + U_R^* U_S) dxdydt\right]}{\iint\int_n |U_R|^2 dxdydt} = + \quad (17)$$

$$\frac{1}{2} + \frac{1}{2}\frac{\iint\int_n |U_B|^2 dxdydt}{\iint\int_n |U_R|^2 dxdydt} + \frac{1}{2}\frac{\iint\int_n |U_S|^2 dxdydt}{\iint\int_n |U_R|^2 dxdydt} +$$

$$\frac{1}{2}\frac{\sigma^2\left[\iint\int_n (U_S U_B^* + U_R^* U_B) dxdydt\right]}{\iint\int_n |U_R|^2 dxdydt} +$$

$$\frac{1}{2}\frac{\sigma^2\left[\iint\int_n (U_S U_B^* + U_S^* U_B) dxdydt\right]}{\iint\int_n |U_R|^2 dxdydt},$$

$$\frac{\sigma^2\left[j\iint\int_n (U_R U_S^* - U_R^* U_S) dxdydt\right]}{\iint\int_n |U_R|^2 dxdydt} = \quad (18)$$

$$\frac{1}{2} + \frac{1}{2}\frac{\iint\int_n |U_B|^2 dxdydt}{\iint\int_n |U_R|^2 dxdydt} + \frac{1}{2}\frac{\iint\int_n |U_S|^2 dxdydt}{\iint\int_n |U_R|^2 dxdydt} +$$

$$\frac{1}{2}\frac{\sigma^2\left[j\iint\int_n (U_R U_B^* - U_R^* U_B) dxdydt\right]}{\iint\int_n |U_R|^2 dxdydt} +$$

$$\frac{1}{2}\frac{\sigma^2\left[\iint\int_n (U_S U_B^* + U_S^* U_B) dxdydt\right]}{\iint\int_n |U_R|^2 dxdydt},$$

respectively. It has been assumed in the derivation of Eqs. (17) and (18) that $$\sigma^2\left(\iint\int_n |U_R|^2 dxdydt\right) = \iint\int_n |U_R|^2 dxdydt \text{ and}$$

$$\sigma^2\left(\iint\int_n |U_B|^2 dxdydt\right) = \iint\int_n |U_B|^2 dxdydt,$$

i.e., the statistical noise in the system is determined by the Poisson statistics of the number of photons detected in a quantum photon detector and both $$\iint\int_n |U_R|^2 dxdydt \text{ and } \iint\int_n |U_B|^2 dxdydt$$

correspond to a large number photons detected in a quantum photon detector. For the case where $$\iint\int_n |U_R|^2 dxdydt \gg \iint\int_n |U_S|^2 dxdydt \text{ and}$$

$$\iint\int_n |U_B|^2 dxdydt \gg \iint\int_n |U_S|^2 dxdydt,$$

the terms on the right hand sides of Eqs. (17) and (18), which depend of $U_S$, can be neglected. This leads to the simplified equations $$\frac{\sigma^2\left[\iint\int_n (U_R U_S^* + U_R^* U_S) dxdydt\right]}{\iint\int_n |U_R|^2 dxdydt} = \quad (19)$$

$$\frac{1}{2} + \frac{1}{2}\frac{\iint\int_n |U_B|^2 dxdydt}{\iint\int_n |U_R|^2 dxdydt} +$$

$$\frac{1}{2}\frac{\sigma^2\left[\iint\int_n (U_R U_B^* + U_R^* U_B) dxdydt\right]}{\iint\int_n |U_R|^2 dxdydt},$$

-continued $$\frac{\sigma^2\left[j\int\int\int_n (U_R U_S^* - U_R^* U_S)dxdydt\right]}{\int\int\int_n |U_R|^2 dxdydt} = \tag{20}$$

$$\frac{1}{2} + \frac{1}{2}\frac{\int\int\int_n |U_B|^2 dxdydt}{\int\int\int_n |U_R|^2 dxdydt} +$$

$$\frac{1}{2}\frac{\sigma^2\left[j\int\int\int_n (U_R U_B^* - U_R^* U_B)dxdydt\right]}{\int\int\int_n |U_R|^2 dxdydt}.$$

It is of value to note that the additional gain in the signal-to-noise ratios for $$\int\int\int_n (U_R U_S^* + U_R^* U_S)dxdydt \text{ and}$$

$$j\int\int\int_n (U_R U_S^* - U_R^* U_S)dxdydt$$

obtained in going from $$\int\int\int_n |U_R|^2 dxdydt = 2\int\int\int_n |U_B|^2 dxdydt \text{ to}$$

$$\int\int\int_n |U_R|^2 dxdydt \gg \int\int\int_n |U_B|^2 dxdydt$$

is a factor of approximately (3/2). However, this latter gain is made at the expense of a considerable increase in the power of the source and in the required dynamic range of the signal processing electronics. Therefore, the optimum choice for $|U_R|$ will typically be with $$\int\int\int_n |U_R|^2 dxdydt \gtrsim 2\int\int\int_n |U_B|^2 dxdydt. \tag{21}$$

When the condition expressed by Eq. (21) is satisfied, the statistical errors given by Eqs. (19) and (20) are bounded as expressed in the following inequalities:

$$\frac{1}{2} < \frac{\sigma^2\left[\int\int\int_n (U_R U_S^* + U_R^* U_S)dxdydt\right]}{\int\int\int_n |U_R|^2 dxdydt} \leq \frac{9}{8} \tag{22}$$

$$\frac{1}{2} < \frac{\sigma^2\left[\int\int\int_n (U_R U_S^* - U_R^* U_S)dxdydt\right]}{\int\int\int_n |U_R|^2 dxdydt} \leq \frac{9}{8}. \tag{23}$$

The interpretation of Eqs. (17) and (18), Eqs. (19) and (20), and Eqs. (22) and (23) is the following: it is possible with the invention disclosed herein to achieve from a set of four intensity measurements the components of the complex scattering amplitude such that for each independent position in the object, the statistical error for each of the components of the inferred complex scattering amplitude is typically within a factor of $(3/2)^{1/2}$ of the limiting statistical error fixed by the statistics of the complex scattering amplitude itself, and that the referred to statistical error can be achieved with lower operating power levels of the source and lower required dynamic range capacity in the signal processing electronics in relation to prior art near-field scanning microscopes and confocal microscopes. The term independent position is used to mean that the associated sets of four measured arrays of signal values are statistically independent arrays.

Systematic Error Due to First and Second Background Return Beam

Eqs. (4) and (5) can be used in conjunction with measured arrays of signal values of $[\Delta S_n]_1$, $[\Delta S_n]_2$, and $|U_R|$ to obtain measurements of the real and imaginary parts of $U_S$. There remains the potential systematic error terms, $$\int\int\int_n (U_R U_B^* + U_R^* U_B)dxdydt \tag{24}$$

$$\int\int\int_n (U_R U_B^* - U_R^* U_B)dxdydt. \tag{25}$$

These systematic error terms can be significant when $|U_B| \gg |U_S|$. Consequently, it is desirable for the interference terms expressed by Eqs. (24) and (25) to be compensated to an acceptable level.

The compensation for the $$\int\int\int_n (U_R U_B^* + U_R^* U_B)dxdydt \text{ and}$$

$$\int\int\int_n (U_R U_B^* - U_R^* U_B)dxdydt$$

terms in the invention disclosed herein requires in general much less in the way of computer processing than that required in prior art near-field microscopy. This is because the spatial properties of $U_B$ depend on the scattering properties of a three dimensional object under examination in prior art near-field microscopy and therefore on $U_S$ through an integral equation. These integral equations, Eqs. (15) and (16), are Fredholm integral equations of the second kind. The computer processing required to perform the inversion of the respective integral equations to obtain Us decreases when the $$\int\int\int_n (U_R U_B^* + U_R^* U_B)dxdydt \text{ and}$$

$$\int\int\int_n (U_R U_B^* - U_R^* U_B)dxdydt$$

terms are reduced such as in apparatus which embodies the present invention. Generally, the rate of decrease in the required computer processing is faster then the rate of reduction of the $$\int\int\int_n (U_R U_B^* + U_R^* U_B)dxdydt \text{ and}$$

$$\int\int\int_n (U_R U_B^* - U_R^* U_B)dxdydt$$

terms.

For those interferometric measurements where the mutual interference terms $$\int\int\int_n (U_S U_B^* + U_S^* U_B)dxdydt \text{ and}$$

$$\int\int\int_n (U_S U_B^* - U_S^* U_B)dxdydt$$

are not compensated in contrast to that in apparatus embodying the present invention, the integral equations corresponding to Eqs. (15) and (16) are nonlinear integral equations: they are integral equations that are second order in $U_S$.

Nonlinear integral equations require in general considerably more sophistication in regards to the computer hardware and software for their solution than do linear integral equations. Thus, the transformation by apparatus embodying the present invention from working with $$\int\int\int_n (U_S U_B^* + U_S^* U_B) dx\, dy\, dt \text{ and}$$

$$\int\int\int_n (U_S U_B^* - U_S^* U_B) dx\, dy\, dt$$

terms to $$\int\int\int_n (U_R U_B^* + U_R^* U_B) dx\, dy\, dt \text{ and}$$

$$\int\int\int_n (U_R U_B^* - U_R^* U_B) dx\, dy\, dt$$

terms represents an important feature of the invention in relation to prior art near-field microscopy.

Note also that the reduction of the systematic error due to the first background return beam $$\int\int\int_n |U_B|^2 dx\, dy\, dt$$

is complete in apparatus embodying the present invention in contrast to that achieved with prior art near-field microscopy.

Applications

The scanning interferometric near-field confocal microscopy systems described above can be especially useful in alignment mark identification on a stepper or scanner of lithography applications used for fabricating large scale integrated circuits such as computer chips and the like and in a stand-alone metrology system for measuring overlay performance of the stepper or scanner. The scanning interferometric near-field confocal systems described above can also be especially useful in inspection of masks used in the stepper or scanner and in the inspection of wafers at different stages of the fabrication of large-scale integrated circuits.

Lithography is the key technology driver for the semiconductor manufacturing industry. In particular, overlay improvement is one of the five most difficult challenges down to and below 100 nm line widths (design rules), see, for example, the *Semiconductor Industry Roadmap*, p82 (1997). Since a lithography tool may produce $50–100M/year of product, the economic value from improving (maintaining) performance of the lithography tool is substantial. Each 1% increase (loss) in yield of the lithography tool results in approximately $1M/year economic benefit (loss) to the integrated circuit manufacturer and a substantial competitive advantage or disadvantage to the lithography tool vendor.

Overlay is measured by printing one pattern on one level of a wafer and a second pattern on a consecutive level of the wafer and then measuring, on a stand-alone metrology system, the difference in the position, orientation, and distortion of the two patterns.

A stand-alone metrology system for measuring overlay comprises a microscope system for viewing the patterns, such as the scanning interferometric near-field confocal systems described above, connected to laser gauge-controlled stage for measuring the relative positions of the patterns, and a wafer handling system.

The function of a lithography tool is to direct spatially patterned radiation onto a photoresist-coated wafer. The process involves determining which location of the wafer is to receive the radiation (alignment) and applying the radiation to the photoresist at that location.

To properly position the wafer, the wafer includes alignment marks on the wafer that can be measured by dedicated sensors such as the scanning interferometric near-field confocal systems described above. The measured positions of the alignment marks define the location of the wafer within the tool. This information, along with a specification of the desired patterning of the wafer surface, guides the alignment of the wafer relative to the spatially patterned radiation. Based on such information, a translatable stage supporting the photoresist-coated wafer moves the wafer such that the radiation will expose the correct location of the wafer.

During exposure, a radiation source illuminates a patterned reticle, which scatters the radiation to produce the spatially patterned radiation. The reticle is also referred to as a mask, and these terms are used interchangeably below. In the case of reduction lithography, a reduction lens collects the scattered radiation and forms a reduced image of the reticle pattern. Alternatively, in the case of proximity printing, the scattered radiation propagates a small distance (typically on the order of microns) before contacting the wafer to produce a 1:1 image of the reticle pattern. The radiation initiates photo-chemical processes in the resist that convert the radiation pattern into a latent image within the resist.

When a mask is made, it must be perfect. Any defects in the pattern will destroy the functionality of the semiconductor circuit that is printed with that mask. Before a mask is delivered to the semiconductor manufacturing line, it is passed through an automated mask inspection system that searches for any defects in the pattern. There are two possible strategies in mask inspection, known as die-to-database and die-to-die inspection. The first method involves an automated scanning microscope that compares the mask pattern directly with the computer data used to generate the mask. This requires a very large data handling capability, similar to that needed by the mask writer itself. Any discrepancy between the inspected mask pattern and the data set used to create it is flagged as an error. The scanning interferometric near-field confocal systems described above are especially well suited for automated mask inspection with its advantages in background reduction and in the substantially simultaneous acquisition of one-dimensional line section images and two-dimensional section images.

In general, the lithography system, also referred to as an exposure system, typically includes an illumination system and a wafer positioning system. The illumination system includes a radiation source for providing radiation such as ultraviolet, visible, x-ray, electron, or ion radiation, and a reticle or mask for imparting the pattern to the radiation, thereby generating the spatially patterned radiation. In addition, for the case of reduction lithography, the illumination system can include a lens assembly for imaging the spatially patterned radiation onto the wafer. The imaged radiation exposes resist coated onto the wafer. The illumination system also includes a mask stage for supporting the mask and a positioning system for adjusting the position of the mask stage relative to the radiation directed through the mask. The wafer positioning system includes a wafer stage for supporting the wafer and a positioning system for adjusting the position of the wafer stage relative to the imaged radiation. Fabrication of integrated circuits can include multiple exposing steps. For a general reference on lithography, see, for example, J. R. Sheats and B. W. Smith, in *Microlithography: Science and Technology* (Marcel Dekker, Inc., New York, 1998), the contents of which is incorporated herein by reference.

Figure 7A:
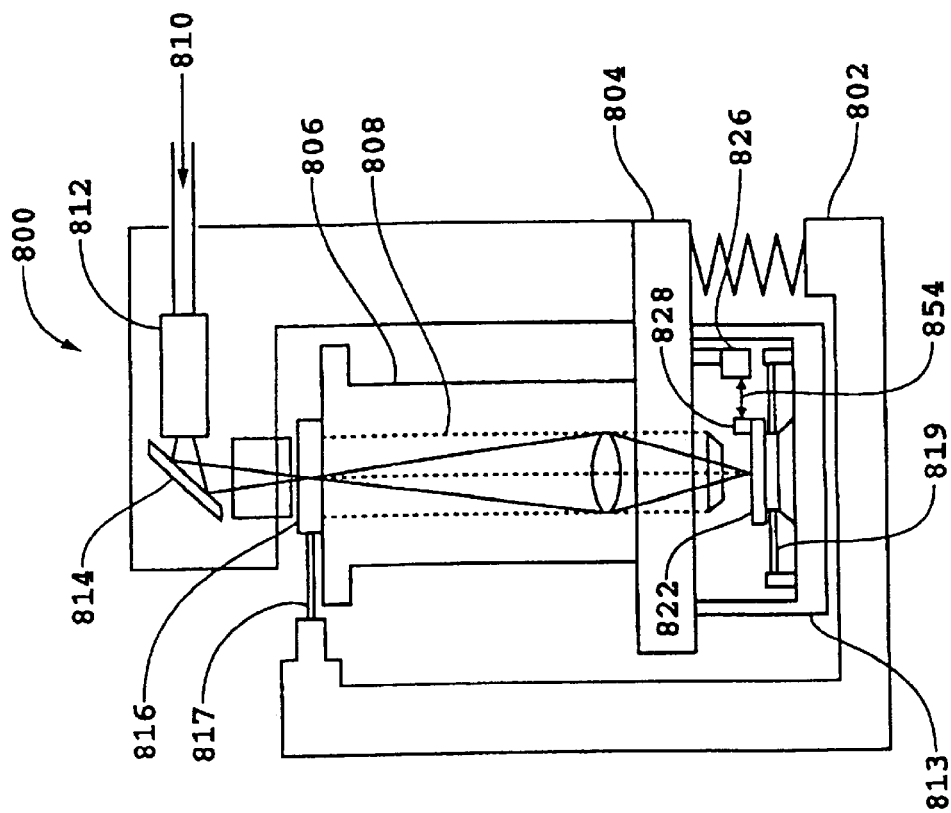

An example of a lithography scanner 800 using a confocal interference microscopy system (not shown) in FIG. 7a. The scanning interferometric near-field confocal system is used to precisely locate the position of alignment marks on the wafer (not shown) within an exposure system. Here, stage 822 is used to position and support the wafer relative to an exposure station. Scanner 800 includes a frame 802, which carries other support structures and various components carried on those structures. An exposure base 804 has mounted on top of it a lens housing 806 atop of which is mounted a reticle or mask stage 816, which is used to support a reticle or mask. A positioning system for positioning the mask relative to the exposure station is indicated schematically by element 817. Positioning system 817 can include, e.g., piezoelectric transducer elements and corresponding control electronics. Although, it is not included in this described embodiment, one or more interferometry systems are used to precisely measure the position of the mask stage as well as other moveable elements whose position must be accurately monitored in processes for fabricating lithographic structures (see supra Sheats and Smith *Microlithography: Science and Technology*).

Suspended below exposure base 804 is a support base 813 that carries wafer stage 822. Stage 822 includes a plane mirror 828 for reflecting a measurement beam 854 directed to the stage by interferometry system 826. A positioning system for positioning stage 822 relative to interferometry system 826 is indicated schematically by element 819. Positioning system 819 can include, e.g., piezoelectric transducer elements and corresponding control electronics. The measurement beam reflects back to the interferometry system, which is mounted on exposure base 804.

During operation, a radiation beam 810, e.g., an ultraviolet (UV) beam from a UV laser (not shown), passes through a beam shaping optics assembly 812 and travels downward after reflecting from mirror 814. Thereafter, the radiation beam passes through a mask (not shown) carried by mask stage 816. The mask (not shown) is imaged onto a wafer (not shown) on wafer stage 822 via a lens assembly 808 carried in a lens housing 806. Base 804 and the various components supported by it are isolated from environmental vibrations by a damping system depicted by spring 820.

Figure 7B:
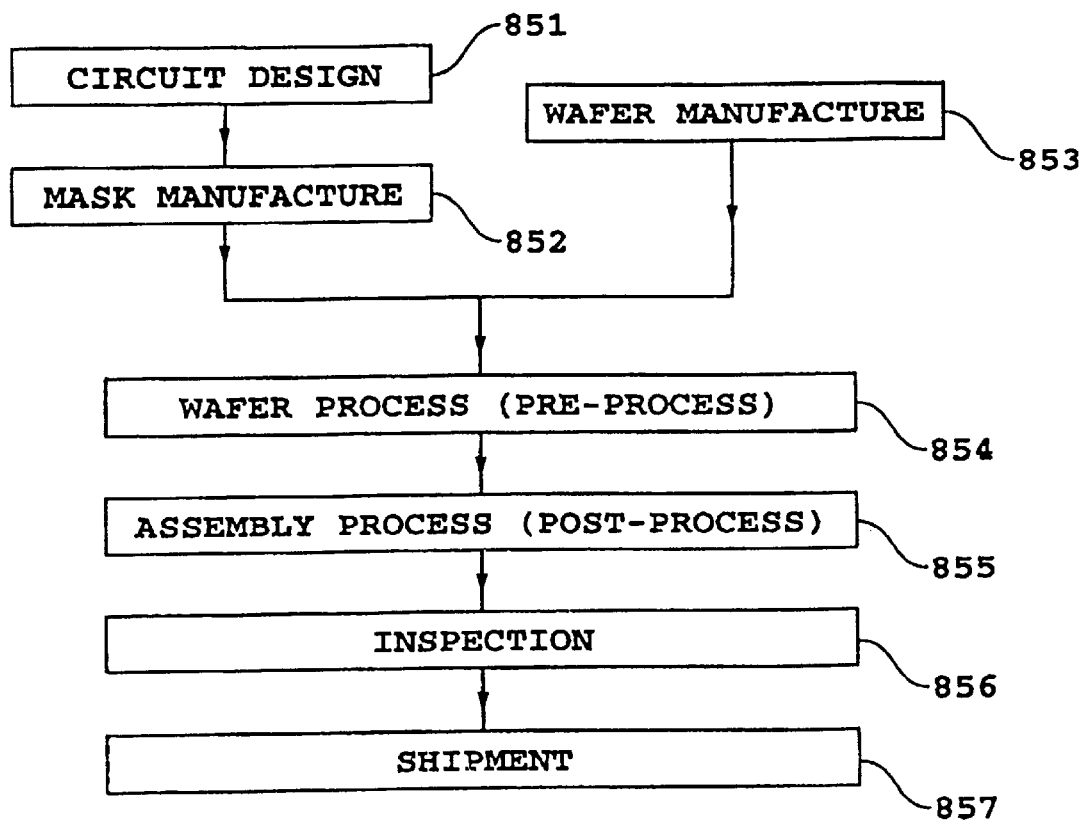

As is well known in the art, lithography is a critical part of manufacturing methods for making semiconducting devices. For example, U.S. Pat. No. 5,483,343 outlines steps for such manufacturing methods. These steps are described below with reference to FIGS. 7b and 7c. FIG. 7b is a flow chart of the sequence of manufacturing a semiconductor device such as a semiconductor chip (e.g. IC or LSI), a liquid crystal panel or a CCD. Step 851 is a design process for designing the circuit of a semiconductor device. Step 852 is a process for manufacturing a mask on the basis of the circuit pattern design. Step 853 is a process for manufacturing a wafer by using a material such as silicon.

Step 854 is a wafer process, which is called a pre-process wherein, by using the so prepared mask and wafer, circuits are formed on the wafer through lithography. To form circuits on the wafer that correspond with sufficient spatial resolution those patterns on the mask, interferometric positioning of the lithography tool relative the wafer is necessary. The scanning interferometric near-field confocal methods and systems described herein can be especially useful to inspect the surface of the wafer and internal layers generate on the wafer by wafer processing to check and monitor the effectiveness of the lithography used in the wafer process. Step 855 is an assembling step, which is called a post-process wherein the wafer processed by step 854 is formed into semiconductor chips. This step includes assembling (dicing and bonding) and packaging (chip sealing). Step 856 is an inspection step wherein operability check, durability check and so on of the semiconductor devices produced by step 855 are carried out. With these processes, semiconductor devices are finished and they are shipped (step 857).

Figure 7C:
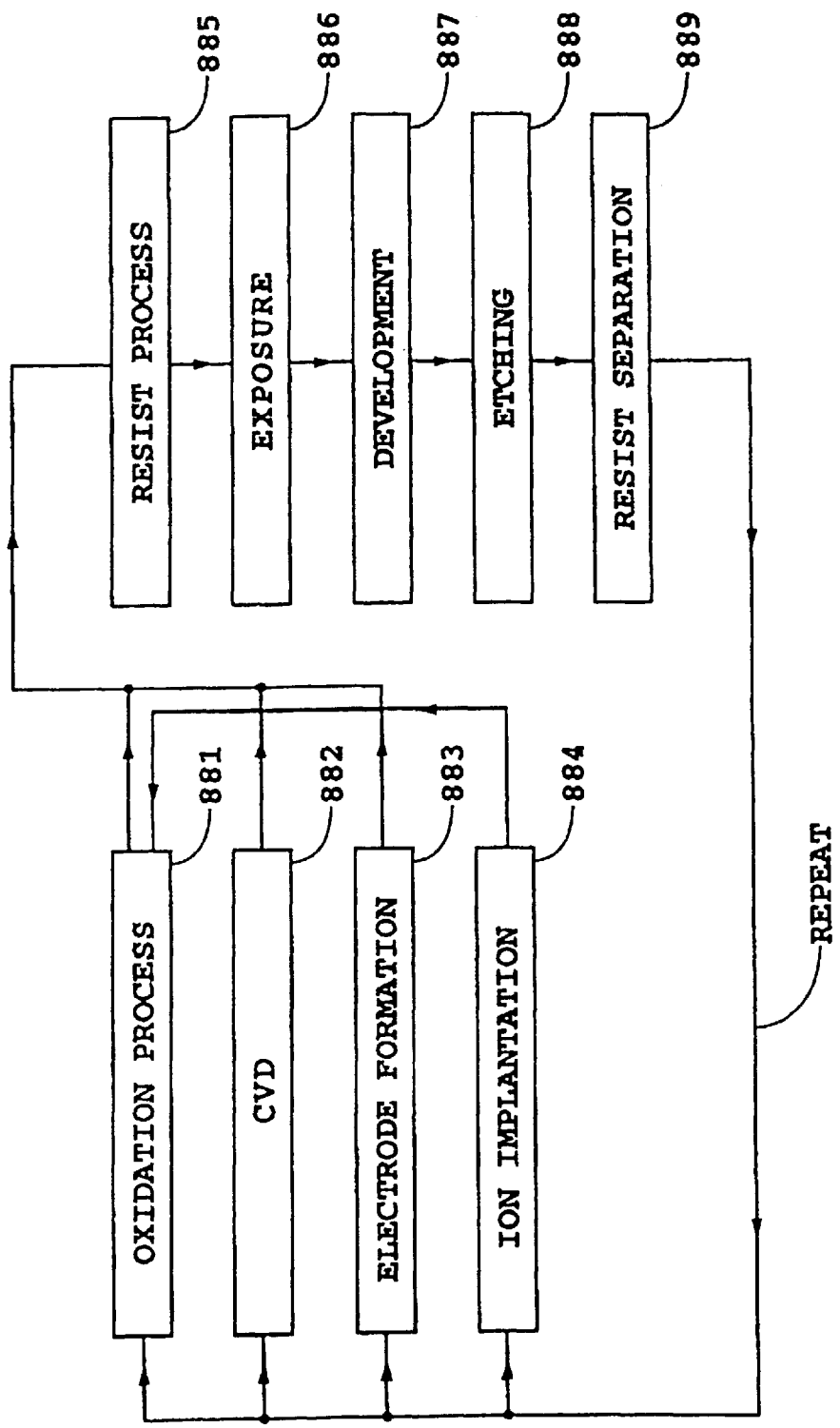
Figure 8:
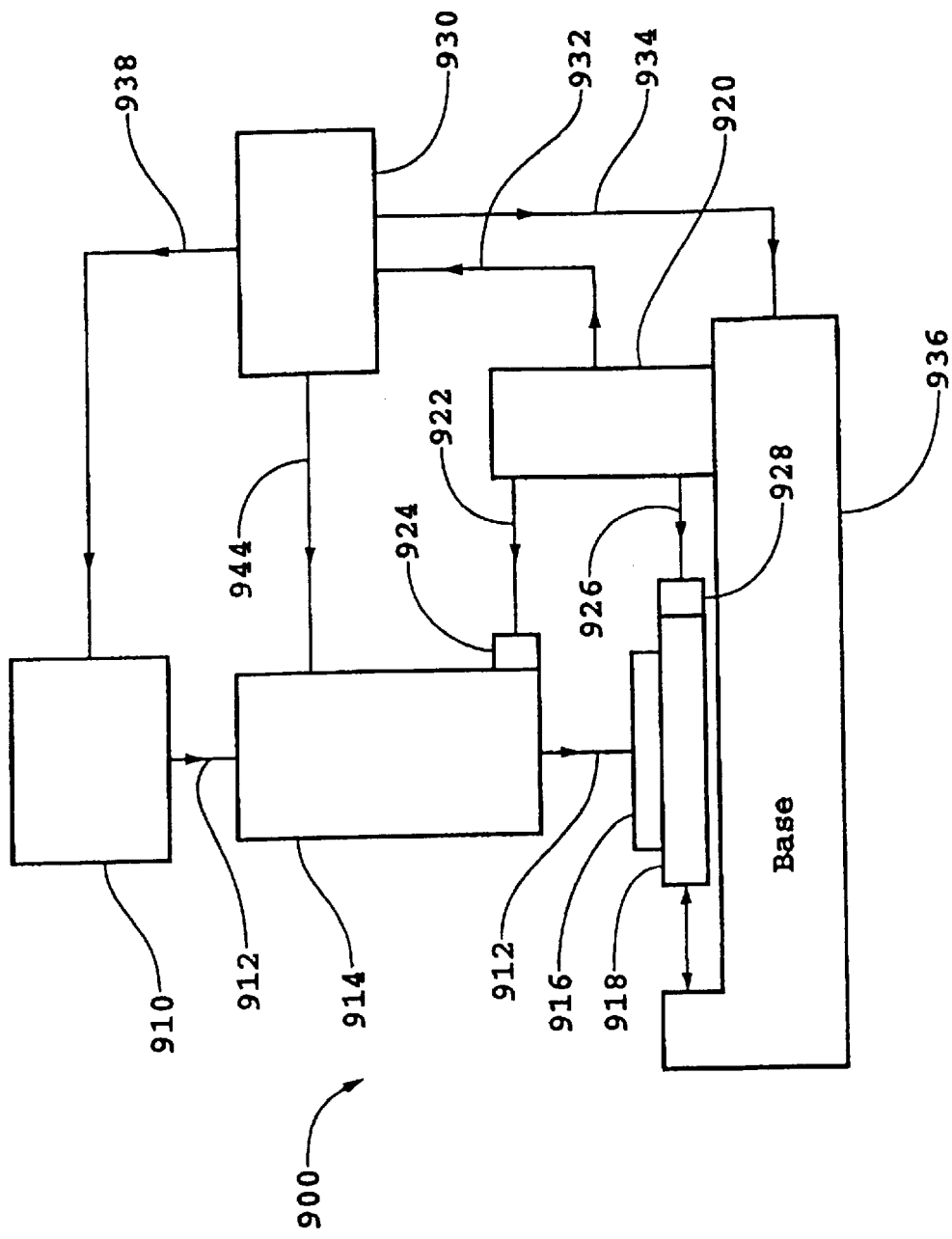
FIG. 8 is a schematic of a mask inspection system using the interferometric near-field confocal microscopy system.

FIG. 7c is a flow chart showing details of the wafer process. Step 861 is an oxidation process for oxidizing the surface of a wafer. Step 862 is a CVD process for forming an insulating film on the wafer surface. Step 863 is an electrode forming process for forming electrodes on the wafer by vapor deposition. Step 864 is an ion implanting process for implanting ions to the wafer. Step 865 is a resist process for applying a resist (photosensitive material) to the wafer. Step 866 is an exposure process for printing, by exposure (i.e., lithography), the circuit pattern of the mask on the wafer through the exposure apparatus described above. Once again, as described above, the use of the scanning interferometric near-field confocal systems and methods described herein improve the accuracy, resolution, and maintenance of such lithography steps.

Step 867 is a developing process for developing the exposed wafer. Step 868 is an etching process for removing portions other than the developed resist image. Step 869 is a resist separation process for separating the resist material remaining on the wafer after being subjected to the etching process. By repeating these processes, circuit patterns are formed and superimposed on the wafer.

An important application of the scanning interferometric near-field confocal systems and methods described herein is the inspection of masks and reticles used in the lithography methods described previously. As an example, a schematic of a mask inspection system 900 is shown in FIG. 9. A source 910 generates a source beam 912 and a scanning interferometric near-field confocal assembly 914 directs the radiation beam to a substrate 916 supported by a movable stage 918. To determine the relative position of the stage, an interferometry system 920 directs a reference beam 922 to a mirror 924 mounted on beam focusing assembly 914 and a measurement beam 926 to a mirror 928 mounted on stage 918. Changes in the position measured by the interferometry system correspond to changes in the relative position of write beam 912 on substrate 916. Interferometry system 920 sends a measurement signal 932 to controller 930 that is indicative of the relative position of inspection beam 912 on substrate 916. Controller 930 sends an output signal 934 to a base 936 that supports and positions stage 918.

Controller 930 can cause scanning interferometric near-field confocal assembly 914 to scan the inspection beam over a region of the substrate, e.g., using signal 944. As a result, controller 930 directs the other components of the system to inspect the substrate. The mask inspection compares the mask pattern directly with computer data used to generate the mask.

While the invention has been described with reference to particular embodiments thereof, those skilled in the art will be able to make the various modifications to the described embodiments without departing from the true spirit and scope of the present invention.

Other aspects, advantages, and modifications are within the scope of the following claims.

What is claimed is:

1. An interferometric system comprising:
   a beam splitter positioned to separate an input beam into a measurement beam and a reference beam;
   a measurement beam source array positioned to receive the measurement beam, the measurement beam source array comprising a mask having an array of measurement apertures each configured to radiate a portion of the measurement beam to an object, the object interacting with the radiated measurement beam portions to direct signal radiation back through the apertures to define a measurement return beam;
   a reference beam source array positioned to receive the reference beam, the reference beam source array comprising an array of elements each configured to radiate a portion of the reference beam, the radiated reference beam portions defining a reference return beam;
   a multi-element photo-detector; and
   imaging optics positioned to direct the measurement and reference return beams to the photo-detector and configured to produce overlapping conjugate images of the array of reference elements and the array of measurement apertures on the photo-detector, wherein the conjugate image for each measurement aperture overlaps with the conjugate image of a corresponding reference element to produce an optical interference signal indicative of a particular region of the object.

2. The system of claim 1, further comprising a pinhole array positioned adjacent the photo-detector, wherein each pinhole is aligned with a separate set of one or more detector elements, and wherein the imaging system causes the conjugate image for each measurement aperture to align with a corresponding pinhole of the pinhole array.

3. The system of claim 1,
   wherein the mask in the measurement beam source array further comprises an array of measurement scattering elements, wherein each measurement scattering element is adjacent a corresponding one of the measurement apertures and has transverse dimensions comparable to the corresponding measurement aperture, and wherein each measurement scattering element scatters a portion of the measurement beam, the measurement return beam further comprising the portions of the measurement beam scattered by the measurement scattering elements, and
   wherein the imaging optics are further configured to produce a conjugate image of the array of measurement scattering elements that overlaps with the conjugate image of the array of reference elements, wherein the conjugate image for each measurement scattering element overlaps with the conjugate image of a corresponding reference element to produce an optical interference signal that provides an estimate of scattering from the adjacent measurement aperture.

4. The system of claim 3, further comprising a pinhole array positioned adjacent the photo-detector, wherein each pinhole is aligned with a separate set of one or more detector elements, and wherein the imaging system causes the conjugate image for each measurement aperture and each measurement scattering element to align with a corresponding pinhole of the pinhole array.

5. The system of claim 1, wherein each reference element comprises a reflective element.

6. The system of claim 1, wherein each reference element comprises a transmissive aperture.

7. The system of claim 1, further comprising a stage for supporting the object and at least one of a scanner and a stepper coupled to the stage for adjusting the position of the object relative to the radiated measurement beam portions.

8. The system of claim 7 further comprising an electronic processor coupled to the detector and the at least one of the scanner and the stepper, wherein during operation the electronic processor analyzes at least one signal generated by the detector element as a function of the relative stage position.

9. The system of claim 1 wherein the beam splitter and the mask are positioned to cause the measurement beam to contact the mask at substantially normal incidence.

10. The system of claim 1 wherein the beam splitter and the mask are positioned to cause the measurement beam to contact the mask at an angle of incidence greater than 10°.

11. The system of claim 1 further comprising a phase shifter positioned to shift the phase of the reference beam relative to the phase of the measurement beam.

12. The system of claim 11, wherein the phase shifter is positioned along the path of the reference beam.

13. The system of claim 11 further comprising an electronic processor coupled to the detector and the phase shifter, wherein during operation the electronic processor sets the phase shift imparted by the phase shifter to each of multiple values and analyzes a signal generated by the detector element for each of the multiple values.

14. The system of claim 11 further comprising an electronic processor coupled to the detector and the phase shifter, wherein during operation the electronic processor causes the phase shift $\chi$ imparted by the phase shifter to be modulated according to $\chi = \chi_0 + \chi_1 \cos \omega t$, where $\chi_1 \neq 0$, t is time, and $\omega$ is the modulation frequency, and analyzes a signal generated by the detector element with respect to the modulation frequency.

15. The system of claim 1 further comprising a source for generating the input beam.

16. The system of claim 15 wherein the source comprises a modulator producing a difference frequency $\omega$ between two components of the input beam.

17. The system of claim 16 wherein the source causes the two components of the input beam to have orthogonal polarizations.

18. The system of claim 16 further comprising an electronic processor coupled to the detector and the modulator, wherein the frequency difference $\omega$ produces a phase difference $\omega t$ between the two components of the input beam, where t is time, and wherein the electronic processor analyzes a signal produced by the detector with respect to the phase difference $\omega t$.

19. The system of claim 18, wherein the source is a pulsed source and wherein the electronic processor is coupled to the pulsed source to synchronize the signal analysis with the phase difference $\omega t$.

20. The system of claim 15, wherein the source can cause the input beam to have one of multiple wavelengths.

21. The system of claim 20 further comprising an electronic processor coupled to the detector and the source, wherein the electronic processor analyzes a signal produced by the detector for each of the multiple wavelengths of the input beam.

22. The system of claim 1 further comprising a retardation plate positioned along the path of the input beam and configured to adjustably control the polarization of the input beam.

23. The system of claim 22 further comprising an electronic processor coupled to the detector and the retardation plate and wherein during operation the electronic processor causes the retardation plate to impart each of multiple polarizations to the input beam and analyzes a signal generated by the detector element for each of the multiple polarizations.

24. An interferometric system comprising:
    a beam splitter positioned to separate an input beam into a measurement beam and a reference beam;
    a measurement beam source array positioned to receive the measurement beam, the measurement beam source array comprising a mask having an array of source apertures each configured to radiate a portion of the measurement beam to an object;
    a measurement beam detector array comprising a mask having an array of measurement apertures, wherein the object interacts with the radiated measurement beam portions and directs the resulting signal radiation through the measurement apertures to define a measurement return beam;
    a reference beam source array positioned to receive the reference beam, the reference beam source array comprising an array of elements each configured to radiate a portion of the reference beam, the radiated reference beam portions defining a reference return beam;
    a multi-element photo-detector; and
    imaging optics positioned to direct the measurement and reference return beams to the photo-detector and configured to produce overlapping conjugate images of the array of reference elements and the array of measurement apertures on the photo-detector, wherein the conjugate image for each measurement aperture overlaps with the conjugate image of a corresponding reference element to produce an optical interference signal indicative of a particular region of the object.

25. The system of claim 24, further comprising a pinhole array positioned adjacent the photo-detector, wherein each pinhole is aligned with a separate set of one or more detector elements, and wherein the imaging system causes the conjugate image for each measurement aperture to align with a corresponding pinhole of the pinhole array.

26. The system of claim 24, wherein each reference element comprises a reflective element.

27. The system of claim 24, wherein each reference element comprises a transmissive aperture.

28. The system of claim 24, further comprising a stage for supporting the object and at least one of a scanner and a stepper coupled to the stage for adjusting the position of the object relative to the radiated measurement beam portions.

29. The system of claim 28 further comprising an electronic processor coupled to the detector and the at least one of the scanner and the stepper, wherein during operation the electronic processor analyzes at least one signal generated by the detector element as a function of the relative stage position.

30. The system of claim 24 wherein the beam splitter and the mask are positioned to cause the measurement beam to contact the mask at substantially normal incidence.

31. The system of claim 24 wherein the beam splitter and the mask are positioned to cause the measurement beam to contact the mask at an angle of incidence greater than 10°.

32. The system of claim 24 further comprising a phase shifter positioned to shift the phase of the reference beam relative to the phase of the measurement beam.

33. The system of claim 32, wherein the phase shifter is positioned along the path of the reference beam.

34. The system of claim 32 further comprising an electronic processor coupled to the detector and the phase shifter, wherein during operation the electronic processor sets the phase shift imparted by the phase shifter to each of multiple values and analyzes a signal generated by the detector element for each of the multiple values.

35. The system of claim 32 further comprising an electronic processor coupled to the detector and the phase shifter, wherein during operation the electronic processor causes the phase shift $\chi$ imparted by the phase shifter to be modulated according to $\chi=\chi_0+\chi_1 \cos \omega t$, where $\chi_1 \neq 0$, t is time, and $\omega$ is the modulation frequency, and analyzes a signal generated by the detector element with respect to the modulation frequency.

36. The system of claim 24 further comprising a source for generating the input beam.

37. The system of claim 36 wherein the source comprises a modulator producing a difference frequency $\omega$ between two components of the input beam.

38. The system of claim 37 wherein the source causes the two components of the input beam to have orthogonal polarizations.

39. The system of claim 37 further comprising an electronic processor coupled to the detector and the modulator, wherein the frequency difference $\omega$ produces a phase difference $\omega t$ between the two components of the input beam, where t is time, and wherein the electronic processor analyzes a signal produced by the detector with respect to the phase difference $\omega t$.

40. The system of claim 39, wherein the source is a pulsed source and wherein the electronic processor is coupled to the pulsed source to synchronize the signal analysis with the phase difference $\omega t$.

41. The system of claim 36, wherein the source can cause the input beam to have one of multiple wavelengths.

42. The system of claim 41 further comprising an electronic processor coupled to the detector and the source, wherein the electronic processor analyzes a signal produced by the detector for each of the multiple wavelengths of the input beam.

43. The system of claim 24 further comprising a retardation plate positioned along the path of the input beam and configured to adjustably control the polarization of the input beam.

44. The system of claim 43 further comprising an electronic processor coupled to the detector and the retardation plate and wherein during operation the electronic processor causes the retardation plate to impart each of multiple polarizations to the input beam and analyzes a signal generated by the detector element for each of the multiple polarizations.

45. An interferometric method comprising:
    separating an input beam into a measurement beam and a reference beam;
    directing the measurement beam to an array of measurement apertures to cause a portion of the measurement beam to couple through each of the measurement apertures and radiate an object;
    receiving signal radiation from the object back through the apertures in response to the radiated measurement beam portions, wherein the signal radiation defines a measurement return beam;
    directing the reference beam to array of reference elements to cause each configured to radiate a portion of the reference beam, the radiated reference beam portions defining a reference return beam; and
    imaging the measurement and reference return beams onto a photo-detector to produce overlapping conjugate images of the array of reference elements and the array of measurement apertures on the photo-detector, wherein the conjugate image for each measurement aperture overlaps with the conjugate image of a corresponding reference element to produce an optical interference signal indicative of a particular region of the object.

46. An interferometric method comprising:

separating an input beam into a measurement beam and a reference beam;

directing the measurement beam to an array of source apertures to cause a portion of the measurement beam to couple through each of the measurement apertures and radiate to an object;

receiving signal radiation from the object through an array of measurement apertures in response to the radiated measurement beam portions, wherein the signal radiation defines a measurement return beam;

directing the reference beam to array of reference elements to cause each configured to radiate a portion of the reference beam, the radiated reference beam portions defining a reference return beam; and imaging the measurement and reference return beams onto a photo-detector to produce overlapping conjugate images of the array of reference elements and the array of measurement apertures on the photo-detector, wherein the conjugate image for each measurement aperture overlaps with the conjugate image of a corresponding reference element to produce an optical interference signal indicative of a particular region of the object.

* * * * *

UNITED STATES PATENT AND TRADEMARK OFFICE
CERTIFICATE OF CORRECTION

PATENT NO. : 6,753,968 B2
DATED : June 22, 2004
INVENTOR(S) : Henry A. Hill

It is certified that error appears in the above-identified patent and that said Letters Patent is hereby corrected as shown below:

Title page,
Item [56], References Cited, OTHER PUBLICATIONS, "Pohl" reference, replace "*Vacc.*" with -- *Vac.* --

Signed and Sealed this

Twenty-fourth Day of May, 2005

JON W. DUDAS
*Director of the United States Patent and Trademark Office*